United States Patent
Balasubramaniam et al.

(10) Patent No.: US 7,275,408 B1
(45) Date of Patent: Oct. 2, 2007

(54) SCANNING BEAM SUSPENSION ADJUSTMENT

(75) Inventors: Senthil Balasubramaniam, Rocky Hill, CT (US); Trent A. Johnson, Hutchinson, MN (US); Derek J. Schanil, Watkins, MN (US); Roger W. Schmitz, Hutchinson, MN (US); Stephen P. Toperzer, Hutchinson, MN (US); Hryhory T. Koba, Hutchinson, MN (US); Timothy G. Rice, Waconia, MN (US); Paul E. Schwing, Waconia, MN (US); Blair M. Erickson, Waconia, MN (US); Mohamed Salah H. Khlif, Fridley, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 467 days.

(21) Appl. No.: 10/409,660

(22) Filed: Apr. 8, 2003

(51) Int. Cl.
*B21D 37/16* (2006.01)

(52) U.S. Cl. .................... 72/342.1; 72/342.94

(58) Field of Classification Search ............ 72/342.1, 72/342.94, 38, 364, 379.2; 29/603.01; 219/121.6, 219/121.65, 121.66, 121.73, 121.78, 121.79, 219/121.8, 121.81, 121.85
See application file for complete search history.

(56) References Cited

U.S. PATENT DOCUMENTS

| | | | |
|---|---|---|---|
| 4,603,567 A | 8/1986 | Smith et al. | |
| 4,777,544 A | 10/1988 | Brown et al. | |
| 5,228,324 A | 7/1993 | Frackiewicz et al. | |
| 5,256,850 A | 10/1993 | Maegawa et al. | |
| 5,297,413 A | 3/1994 | Schones et al. | |
| 5,303,108 A | 4/1994 | Higashionji et al. | |
| 5,341,256 A | 8/1994 | Murata et al. | |
| 5,347,415 A | 9/1994 | Murata et al. | |
| 5,471,734 A | 12/1995 | Hatch et al. | |
| 5,537,276 A | 7/1996 | Mukae et al. | |
| 5,588,200 A | 12/1996 | Schudel | |
| 5,832,764 A | 11/1998 | Girard | |
| 6,011,239 A | 1/2000 | Singh et al. | |
| 6,057,975 A | 5/2000 | Yaeger et al. | |
| 6,548,009 B1* | 4/2003 | Khlif et al. | 264/400 |
| 6,640,604 B2* | 11/2003 | Matsushita | 72/342.1 |
| 6,711,929 B2* | 3/2004 | Yamaguchi et al. | 72/342.1 |

(Continued)

FOREIGN PATENT DOCUMENTS

JP          53-149107          12/1978

(Continued)

OTHER PUBLICATIONS

Laser Gram Load Adjust For Improved Disk Drive Performance; Singh, Gurinder P., Wu, Ziao Z., Brown, Bryon R. and Kozlovsky, William; Jul. 17, 2000; 10 pages.

*Primary Examiner*—Ed Tolan
(74) *Attorney, Agent, or Firm*—Faegre & Benson LLP

(57) ABSTRACT

Apparatus and method for simultaneously adjusting the gram load and radius geometry height of a head suspension by scanning a spring region of the head suspension with a laser beam. The incremental height difference between left and right legs of a spring region of the suspension may also be concurrently corrected. Apparatus and method for measuring the radius geometry height are provided by two or more non-contacting optical probes. A nitrogen atmosphere may be maintained in the region scanned.

24 Claims, 24 Drawing Sheets

U.S. PATENT DOCUMENTS

| | | | |
|---|---|---|---|
| 6,837,092 B1 * | 1/2005 | Ubl et al. | 72/342.1 |
| 2003/0154005 A1 * | 8/2003 | Wong et al. | 700/279 |
| 2004/0016733 A1 * | 1/2004 | Thaveeprungsriporn | 219/121.85 |
| 2006/0072381 A1 * | 4/2006 | Girard | 369/30.27 |

FOREIGN PATENT DOCUMENTS

| | | |
|---|---|---|
| JP | 57-167163 | 10/1982 |
| JP | 60-147982 | 8/1985 |
| JP | 60-244495 | 12/1985 |
| JP | 61-189463 | 11/1986 |
| JP | 01-227279 | 9/1989 |
| JP | HEISEI 1-227279 | 9/1989 |
| JP | 3-192586 | 8/1991 |
| JP | 5-7572 | 12/1991 |
| JP | 4-310614 | 11/1992 |
| JP | HEISEI 5-159501 | 6/1993 |
| JP | 5-189906 | 7/1993 |
| JP | 58-88873 | 3/1999 |
| JP | 59-25929 | 7/1999 |
| JP | 2000-339894 | 12/2000 |
| NL | 92-01768 | 6/1993 |

* cited by examiner

SCANNING BEAM SUSPENSION ADJUSTMENT

TECHNICAL FIELD

The present invention relates generally to an apparatus and method for simultaneously adjusting parameters of a head suspension through the application of a laser beam to the head suspension. More particularly, the present invention is an apparatus and method for simultaneously adjusting at least the gram load and radius geometry height of a head suspension by scanning a spring region of the head suspension with a plurality of laser beam scan lines.

BACKGROUND OF THE INVENTION

Head suspensions are well known and commonly used within dynamic magnetic or optical information storage devices or drives with rigid disks. The head suspension is a component within the disk drive that positions a magnetic or optical read/write head over a desired position on the storage media where information is to be retrieved (read) or transferred (written). Head suspensions for use in rigid disk drives typically include a load beam that generates a spring force and that supports a flexure to which a head slider having the read/write head is to be mounted. The load beam includes a mounting region at a proximal end, a rigid region at a distal end, and a spring region between the rigid region and the mounting region for providing the spring force. Head suspensions are normally combined with an actuator arm or E-block to which the mounting region of the load beam is mounted with a base plate so as to position (by linear or rotary movement) the head suspension, and thus the head slider and read/write head, with respect to data tracks of the rigid disk.

The rigid disk within a disk drive rapidly spins about an axis, and the head slider is aerodynamically designed to "fly" on an air bearing generated by the spinning disk. The spring force (often referred to as the "gram load") generated by the load beam (when the load beam is at its "fly height") urges the head slider in a direction toward the disk opposing the force generated by the air bearing. The point at which these two forces are balanced during operation is the "fly height" of the head slider.

Another important attribute of head suspensions is referred to as radius geometry height or "RG height." This attribute or characteristic of the head suspension is the offset or distance that specific points or area of the rigid portion of the load beam of the suspension are displaced from a mounting plate in the mounting region of the suspension. RG height is an important characteristic to control, because it affects the torsional resonance characteristics of the load beam and thus affects overall performance of the head suspension assembly.

In addition to "RG height," the load beam may be characterized by a parameter referred to as Delta Radius Geometry or ARG or "Delta Height." This parameter measures the twist of the load beam. It is measured by finding the difference between RG height measured on each of two radius legs or arms. A twisted load beam can result in a suspension with poor resonance characteristics, in addition to possible distortion in flying attitude of the head slider. The twist affects windage, bending modes and torsional modes of the suspension. The "Delta Height" is thus seen to be the incremental height between the pair of legs in the spring region of the suspension.

The flexure typically includes a slider bond pad to which the head slider is attached. The flexure provides a resilient connection between the head slider and the load beam, and permits pitch and roll motion of the head slider and read/write head during movement over the data tracks of the disk in response to fluctuations in the air bearing caused by fluctuations in the surface of the rigid disk. The roll axis about which the head slider gimbals is a central longitudinal axis of the head suspension. The pitch axis about which the head slider gimbals is perpendicular to the roll axis. That is, the pitch axis is transverse to the longitudinal axis of the load beam, and crosses the roll axis at or around the head slider.

In order to store and retrieve data from magnetic or optical disks on which data is densely packed, it is necessary for the head slider to fly closely above the surface of the spinning data disk (on the order of 0.1 μm) without colliding with the disk ("crashing"). Further, because of the dense packing of data on magnetic or optical disks, it is important for the read/write head attached to the head slider to be able to read from or write to a relatively small area or spot on the disk.

The gram load provided by the spring region of the load beam is transferred to the flexure via a dimple or other pivoting structure that extends between the rigid region of the load beam and the flexure. The structure that extends between the rigid region of the load beam and the flexure is referred to herein as the "gimbal region" to distinguish from the "spring region" which, as used herein, refers only to the region adjacent a rigid mounting region, usually between the mounting region and the rigid region of the load beam. In the prior art, the spring region (which in some instances may be part of the load beam) was mechanically deformed, using a process of roll bending to impart a curvature to at least a portion of the spring region, typically moving the load beam out of plane from the mounting region (where, typically, a base plate was attached).

The prior art also included adjusting the spring region using a diode laser to thermally bulk heat the load beam in the spring region while the load beam was mechanically moved in an attempt to "trim" or correct radius geometry height. Also, reverse bending or "back bending" typically occurred in the process of manufacture of the head suspension, where the part was intentionally bent or plastically deformed one time, in a direction opposite to and after the rolling process is applied to the part to form the spring region. When the part was subsequently integrated into a head stack assembly, the suspension is "bent back" again to fit the heads between the discs. Lack of care in this subsequent bending process has been known to plastically deform the part, resulting in an error in gram load known as "load loss" or more particularly, "suspension gram load loss." The phenomenon of suspension gram load loss is to be distinguished from "gram creep" or more properly "elastic recovery instability." The term "recovery instability" refers to the portion of the strain that remains immediately after the stress is removed and disappears after a period of time. The phrase "elastic recovery instability" refers to instability in the "recovery" after adjustment of the head suspension. The present invention overcomes a substantial amount of the elastic recovery.

Moreover, the prior adjustment method described above was typically performed using three stations, with the individual head suspension entering a first station dedicated to measuring the head suspension radius geometry height and gram load, then passing the individual head suspension to a second station in which adjustments were made, after which that particular head suspension was transferred to a third station which measured the head suspension again. If the radius geometry and gram load were not both within specifications as measured by the third station, the part was rejected, because cycle times would be unacceptably long if the part were to be recycled through the series of stations. Furthermore, such parts are typically carried in a strip of, e.g., 12 for ease of processing. If one or some, but not all, of the parts in a strip were out of spec, the in-spec parts would be subject to additional handling if the strip were to be "recycled" through the stations, thus exposing good parts to potential degradation because of the additional handling.

From the above, it can be seen that there has been a continuing need to develop more efficient methods for correcting the RG height (more particularly the radius geometry height) and for adjusting the gram load. A method that provides precise error corrections for both height and gram load in a timely fashion, and that can be achieved without significant impact on other performance criteria of the head suspension is highly desirable. It is further desirable to be able to adjust delta radius geometry, if necessary, to eliminate or at least reduce twist in the load beam.

Techniques for adjusting only the gram load of the head suspension assembly after it has been rolled are generally known and disclosed, for example, in the Girard U.S. Pat. No. 5,832,764 and the Schones et al. U.S. Pat. No. 5,297,413. Briefly, one such method is a laser adjust technique. A known property of stainless steel members such as load beams is that the force they exert in response to attempts to bend them can be reduced through exposure to thermal energy. The functional relationship between the amount of force reduction and the amount of heat to which a member is exposed can be empirically determined. The light adjust method makes use of this empirically determined relationship to "downgram" or lower the gram load of load beams that have been purposely manufactured (e.g., through rolling operations of the type described above) to have an initial gram load greater than the desired gram load value.

Equipment for performing the light adjust method includes a clamp for clamping the mounting region of the suspension to a fixed base or datum, and a load cell for measuring the gram load of the suspension. A computer controlled actuator moves the load cell into engagement with the flexure and elevates the flexure to a z-height or offset with respect to the datum which corresponds to the specified fly height for the suspension (i.e., the gram load is measured at fly height). In practice, the measured gram load quickly rises toward its then-current value as the flexure is elevated. When the measured gram load reaches an upper range specification, the computer actuates or turns on a high intensity light to apply heat to the load beam. Since the applied heat reduces the actual gram load of the suspension, the measured gram load quickly peaks. Continued application of laser energy causes the measured gram load to decrease with time. The computer deactuates or turns off the light when the measured gram load has decreased to a predetermined set point, typically a load between the nominal or desired gram load and the lower range specification. Once the light has been turned off, the decrease in gram load quickly slows and reaches its minimum value (often at a gram load below the lower range specification) as the heat in the suspension dissipates. However, as the load beam continues to cool, the measured gram load increases and stabilizes at an equilibrium or final load value that is preferably within the specification range, and ideally close to the nominal specification. The final gram load is also measured following the light adjust procedure. This measurement is used by a computer to update a stored model (e.g., the setpoint) of the functional relationship between the amount of heat applied (e.g., light "on" time) and the gram load reduction, to optimize the accuracy of the results obtained by the light adjust procedure. It is to be understood that the above described light adjust procedure does not use any scanning movement to accomplish its goal. The light source in the above procedure is thus a general energy source, applying heat generally to the spring region.

Computer controlled mechanical bending procedures have also been used to adjust the gram load on load beams. The mechanical bending method makes use of an empirically determined relationship between the amount that the load beam is mechanically bent and the associated change in gram load. For a range of gram load adjustments that are typically performed by this technique, a simple linear regression line has been found to accurately describe this relationship. In practice, this technique is implemented by a computer coupled to a stepper motor-driven bending mechanism and a load cell. A model of the relationship between changes in gram load and the number of motor steps (i.e., the associated amount or extent of bending required) is stored in the computer. After the then-current gram load of the suspension is measured by the load cell, the computer calculates the required load correction (i.e., the difference between the measured and desired loads). The computer then accesses the model as a function of the required correction to determine the number of motor steps required to achieve the required load correction, and actuates the stepper motor accordingly. Once the load beam has been bent, the then-current gram load is again measured and used to update the model. Measured data from a given number of the most recently executed mechanical bends is used to recompute the regression line data prior to the execution of the next mechanical bend.

The air bearing head slider assembly is mounted to the flexure and the lead wires clamped to the load beam after the gram load of the suspension has been initially set using methods such as those described above. Unfortunately, the mechanical handling and assembly procedures involved in this manufacturing operation sometimes forces the gram load of the assembled head suspension assembly beyond the specification range. Since the gram load specification is so critical to proper disk drive operation, these out-of-specification head suspension assemblies cannot be used unless the gram load is readjusted to the specification range. A machine which uses both light-adjust and mechanical bending procedures to "regram" suspensions is shown in the Schones et al. U.S. Pat. No. 5,297,413.

RG height and $\Delta$RG are important because of its relationship to head suspension resonance characteristics. In order for the head slider assembly to be accurately positioned with respect to a desired track on the magnetic disk, the suspension must be capable of precisely translating or transferring the motion of the positioning arm to the slider assembly. An inherent property of moving mechanical systems, however, is their tendency to bend and twist in a number of different modes when driven back and forth at certain rates known as resonant frequencies. Any such bending or twisting of a suspension causes the position of the head slider assembly to deviate from its intended position with respect to the desired track. Since head suspension assemblies must be driven at high rates of speed in high performance disk drives, the resonant frequencies of a suspension should be as high as possible.

As discussed in the Hatch et al. U.S. Pat. No. 5,471,734, the position, shape and size of the roll or bend in the spring region of a suspension, sometimes generally referred to as the radius geometry or profile of the suspension, can greatly affect its resonance characteristics. The radius geometry of a suspension must therefore be accurately controlled during manufacture to optimize the resonance characteristics of the part.

SUMMARY OF THE INVENTION

The present invention is intended to overcome the shortcomings of conventional methods for adjusting performance characteristics of a head suspension, particularly the radius geometry height and gram load of the head suspension. The technique of the present invention can provide sufficiently precise corrections to meet increasingly tight performance requirements on radius geometry height and gram load, while at the same time reducing the effect of suspension gram load loss on the head suspension. The present invention can also be performed at relatively fast cycle times, and can provide corrections that have limited impact on other performance parameters of the head suspension. In addition, the present invention is advantageous in that it involves minimal mechanical contact with the suspension.

The present invention includes a method of scanning a predetermined region (preferably the spring region) of the head suspension with a relatively narrow laser beam, in contrast to the prior art approach of using a relatively broad beam. Scanning the predetermined region of the head suspension with the narrow laser beam imparts heat to a very localized path in a controlled manner, to simultaneously adjust the radius geometry height (RGH) and gram load performance parameters of the head suspension by controlling the location and number of lines scanned by the laser beam in the spring region. In addition, the delta radius geometry (ΔRG) may be simultaneously adjusted by controlling the location and number of lines scanned with respect to the lateral (left and right) sides of the spring region. In the practice of the present invention, the spring region typically has one or more generally centrally located apertures or cutouts separating a first scan region from a second scan region transversely disposed with respect to the first scan region. A plurality of lines can be scanned in the first and second scan regions, with the lines being adjacent to each other and parallel to the transverse (pitch) axis of the head suspension. In such an embodiment, the lines preferably extend across the entire width of a first scan region and the second scan region, both located in the spring region, and each line causes a discrete amount of adjustment in the spring region to introduce an adjustment to the gram load and radius geometry height of the head suspension. The location of the central line of the plurality of lines and the number and spacing of the lines enables simultaneous or concurrent control of radius geometry height, delta radius geometry, and gram load, all based on stored data previously acquired for that type of head suspension.

Another aspect of the present invention includes an iterative, closed loop process for providing precise adjustments to the radius geometry height and gram load of a head suspension. In this aspect, a coarse adjustment is performed by scanning the scan region of the head suspension with the laser beam. The result obtained by the coarse adjustment is measured and a fine adjustment is performed by scanning the scan region a second time with the laser beam.

A still further aspect of the present invention includes an iterative process for providing precise adjustments to the delta radius geometry height in addition to the radius geometry height and gram load of the head suspension. In this aspect, separate adjustment of the left and right sides of the spring region is performed by scanning the left and right sides of the scan region in different locations with the laser beam. Additionally, the scanning may be performed in two steps, with a coarse adjustment typically on both sides followed a fine adjustment on one or both sides, if necessary and desired. In the practice of this aspect of the present invention, measurement of gram load and radius geometry height after each coarse adjustment is preferably used in a dynamic regression for optimizing gram load and RG height, and for adjusting the gram load and height interaction. If fine adjustment is made, a subsequent measurement of gram load and RG height is preferably used in a dynamic regression to optimize parameters for fine adjustment of the gram load and RG height.

In the practice of this aspect of the present invention, the amount of scanning, e.g., the number and location of the scan lines necessary to provide coarse correction of the RG height, ΔRG, and gram load is determined and memorized. Determining the location and number of scan lines necessary to correct the RG height, ΔRG, and gram load errors on subsequently processed head suspensions of the same type is accomplished by referencing stored data describing the relationship between angular deflection and the number and location of lines scanned in the various parts of the spring region of a head suspension load beam of that type. It is particularly to be understood that stored data is ordinarily maintained on a model by model (or type) basis, for retrieval and use with subsequent load beams of the particular type or model for which data has been stored.

The fine adjustment can be performed in a similar fashion, wherein the remaining RG height, ΔRG, and gram load error between the desired values and the actual values present in the head suspension after the coarse adjustment are first determined, and the amount of scanning necessary to compensate for the remaining errors is predicted. The prediction can be made by consulting stored fine adjustment data describing the relationship between the angular deflection and the number of scan lines scanned in the scan region of the head suspension. The number and or location of scan lines for the fine adjustment can be upwardly or downwardly adjusted based upon the stored data. It is to be understood that the stored data (in either a single data set or plural data sets) is to preferably encompass a range of values sufficient to enable both the coarse and fine adjustments to be carried out in this version of the present invention. It is to be further understood that segmenting or "binning" may be used in the process of updating the stored data. In this aspect, the data is partitioned into segments covering the expected range of values for unprocessed parts, so that historical data will be maintained for all segments of the range of possible values of the stored data, even when a long run of parts falls within a band considerably narrower than the full range of possible values.

Additionally, it has been found desirable to provide an indirect nitrogen purge during laser scanning, to enable the use of higher power levels without discoloration of parts scanned.

DETAILED DESCRIPTION OF THE INVENTION

Figure 1:
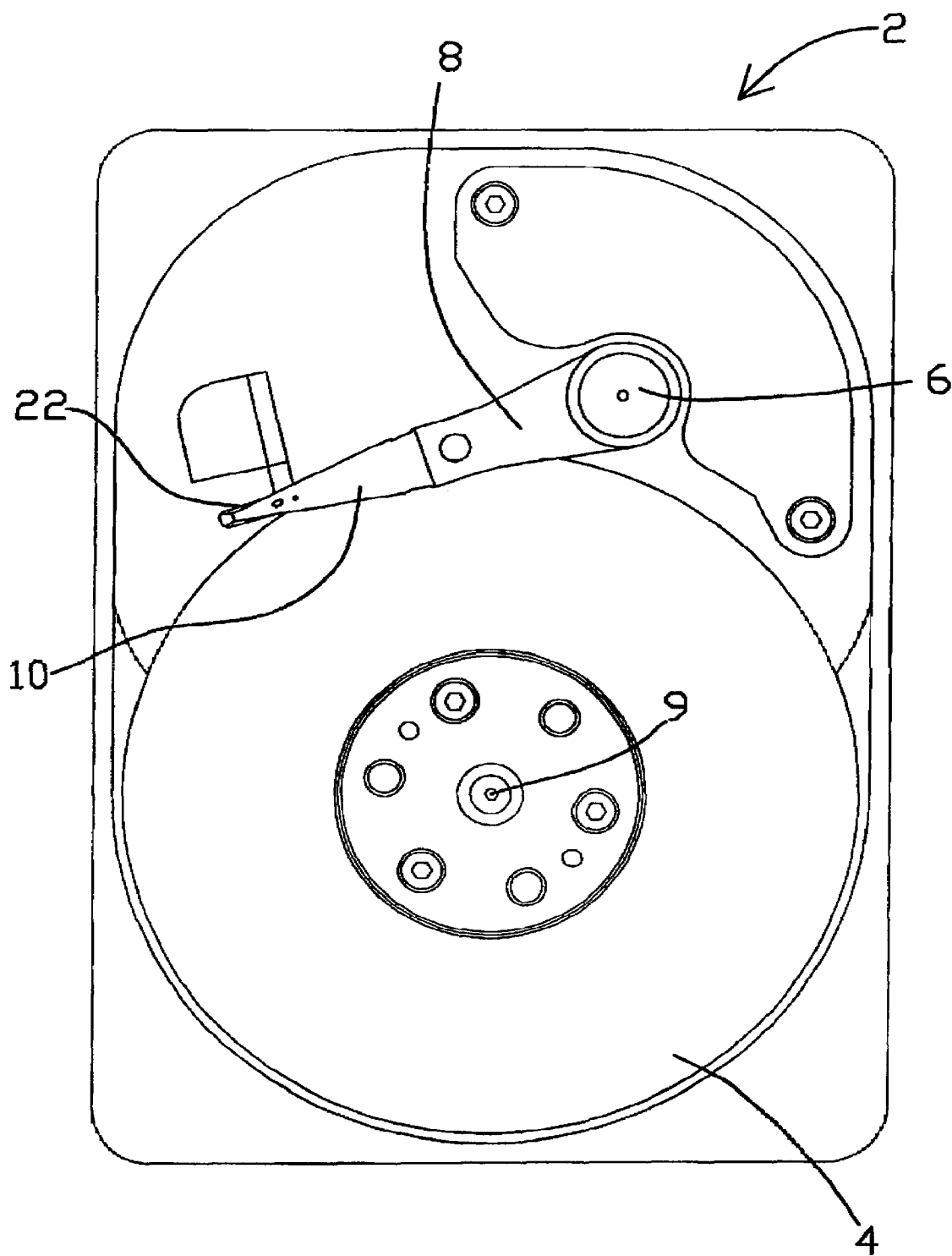
FIG. 1 is a top planar view of a disk drive having a head suspension assembly positioned over a magnetic disk.

With reference now to the Figures, a disk drive 2 having a head suspension 10 suspended over a disk 4 is shown in FIG. 1. Head suspension 10 supports a head slider 22 at its distal end over the disk 4. Head suspension 10 is attached at its proximal end to an actuator arm 8, which is coupled to an actuator motor 6 mounted within disk drive 2. Actuator motor 6 is used to position the actuator arm 8, head suspension 10, and slider 22 over a desired position on the disk 4. In the embodiment shown, actuator motor 6 is rotary in nature, and operates to radially position the head suspension 10 and slider 22 over disk 4. Other actuator motors, such as a linear actuator motor, can of course be used.

In use, a read/write head on head slider 22 reads and/or writes data to and from disk 4 in disk drive 2, and the head suspension 10 supports and aligns the head slider 22 over a desired location on disk 4 in response to signals received from a microprocessor (not shown). Disk 4 rapidly spins about an axis 9, and an air bearing is created by rotating disk 4. Head slider 22 is aerodynamically designed to "fly" on the air bearing between the surface of the disk 4 and the head slider 22. As head slider 22 flies over the air bearing, it is urged away from the surface of the disk 4 by the air bearing. Head suspension 10 provides a gram load spring force that counteracts the force of the air bearing and urges the head slider 22 toward the surface of the disk 4, reaching stable equilibrium at the "fly height" of the head slider 22. The specific positional orientation of head slider 22 provided by head suspension 10 at the fly height in relation to the surface of the disk 4 is commonly referred to as the "dynamic attitude" of the head slider 22.

Figure 2:
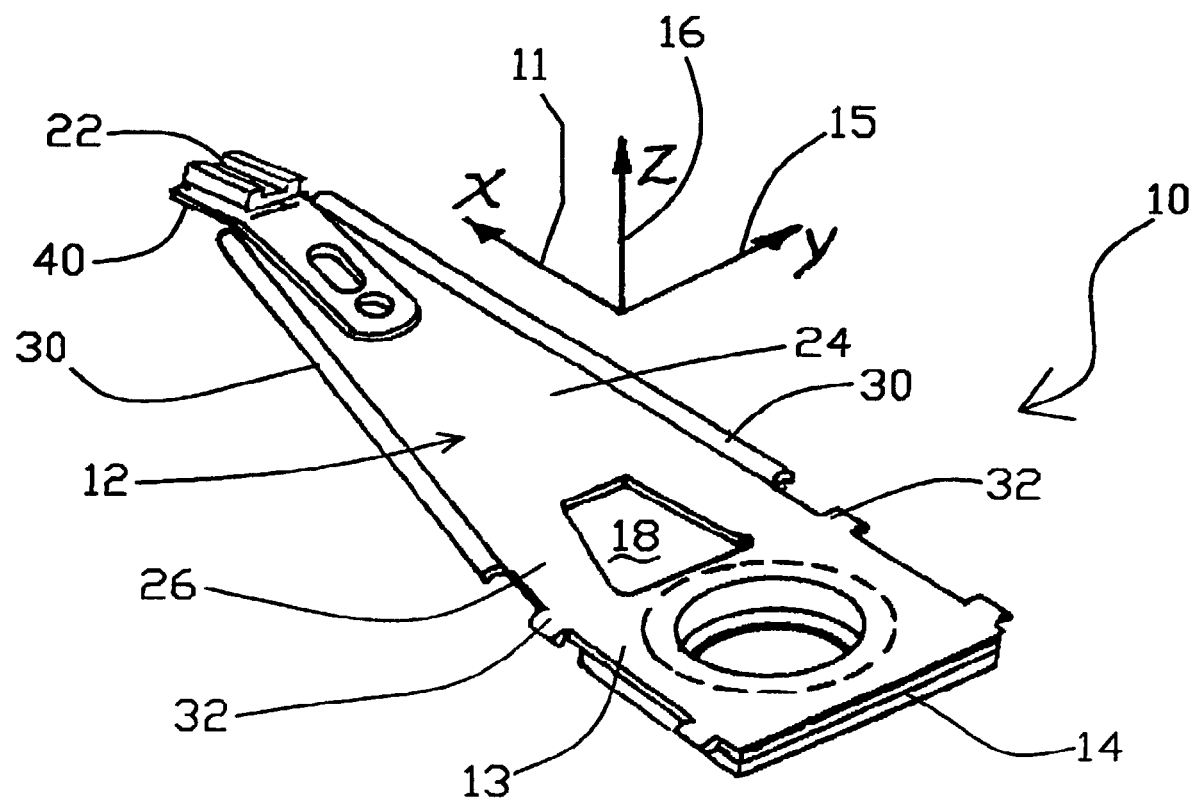
FIG. 2 is an isometric view of a head suspension assembly inverted with respect to the view shown in FIG. 1.

As shown in greater detail in FIG. 2, head suspension assembly 10 is typically made up of a plurality of separate components that are secured together. Head suspension assembly 10 includes a load beam 12 to which a flexure 40 is mounted. Load beam 12 includes a mounting region 13 at the proximal end of the load beam 12, to which a base plate 14 is mounted. As may be seen in FIG. 1, mounting region 13 and base plate 14 are mounted to the actuator arm 8 for operation in disk drive 2. Load beam 12 further includes a rigid region 24 at a distal portion of the load beam 12, and a spring region 26 located intermediate the rigid region 24 and the mounting region 13. Flexure 40 (discussed more fully below) is mounted at a distal end of the rigid region 24 of load beam 12 to provide a resilient connection between the load beam 12 and head slider 22.

Spring region 26 of load beam 12 provides a desired gram load that opposes the force exerted upon head slider 22 by the air bearing generated by rotating disk 4. Toward this end, spring region 26 can include a bend or radius that provides the desired gram load or force. The gram load generated by spring region 26 is transmitted to flexure 40 through rigid region 24 of load beam 12. A load point dimple 9 (not shown) that extends between the rigid region 24 and the flexure 40 can be used to provide a point of transfer for the gram load generated by spring region 26. The load point dimple also provides a point about which the head slider 22 attached to flexure 40 can gimbal in response to fluctuations in the air bearing.

Flexure 40 provides a resilient connection between head slider 22 and load beam 12, and is designed to permit head slider 22 to gimbal in response to variations in the air bearing generated by rotating disk 4. That is, minute variations in the surface of disk 4 will create fluctuations in the air bearing generated by the rotating disk 4. These fluctuations in the air bearing will cause slider 22 to roll about a longitudinal axis 11 of head suspension 10, and to pitch about a transverse axis 15. Longitudinal axis 11 is defined to extend along the center line of head suspension 10 and through the load point dimple, while transverse axis 15 is defined to be orthogonal to axis 11 and intersect axis 11 at the load point dimple between load beam 12 and flexure 40. Flexure 40 is designed to permit the slider 22 to gimbal in both pitch and roll directions in response to these air bearing variations. In the embodiment shown, flexure 40 is separately formed from load beam 12. It is to be understood that the head suspension assembly 10 shown here is a three-piece design made up of the base plate 14, load beam 12, and flexure 40. Flexure 40 preferably includes a flexure mounting region (not shown in detail) that overlaps and is mounted to the rigid region 24 of load beam 12 using spot welds or other known techniques. Flexure 40 also includes a gimbal region (not shown) that can extend beyond the distal end of load beam 12, to provide the compliance that permits slider 22 to gimbal in pitch and roll directions.

Flexure 40 may also include a trace assembly (not shown) that provides electrical interconnection between slider 22 and read/write drive circuitry (not shown) of disk drive 2 for connecting read and write signals to and from the read/write head on slider 22.

During the manufacture of suspensions 10, elongated carrier strips having a plurality of flat and unformed load beam blanks extending therefrom are chemically etched from thin sheets of stainless steel or other spring material. Carrier strips with flat and unformed flexure blanks are etched in a similar manner from sheets of stainless steel. During subsequent manufacturing operations any side rails 30, wire lead captures 32, load point dimples (not visible) and any other structures which extend upwardly or downwardly from the generally planar surface of the load beam 12 (i.e., in what is known as the z-height direction), along a z-axis 16 are formed on the load beam blanks by conventional mechanical forming procedures. Any structures on the flexure blanks requiring z-height deformation (e.g., load point dimples, not shown) are formed in a similar manner. After forming, the flexures 40 are welded to the distal ends of the load beams 12. The carrier strip is then cut or "detabbed" from the flexures 40. Baseplates 14 also are welded to the mounting regions 13 of the load beams 12 following the forming operations.

In another suspension design known as a two-piece design or integrated gimbal suspension (not shown), the flexure is etched in the distal end of the rigid region of the load beam. Portions of the integrated gimbal which extend from the planar surface of the load beam in the z-height direction are formed along with other structures on the load beam during the forming operation. A baseplate is typically welded to the mounting region after these load beam and integrated gimbal etching and forming operations.

Figure 3:
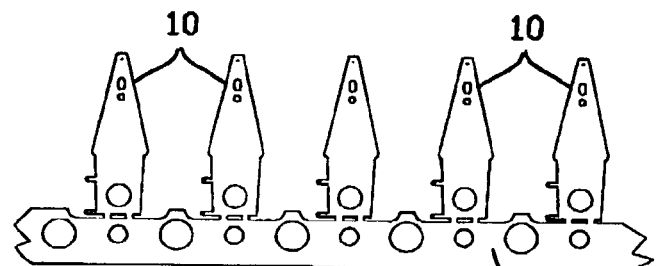
FIG. 3 is an illustration of a carrier strip with a plurality of generally flat load beam extension blanks extending therefrom.
Figure 4:
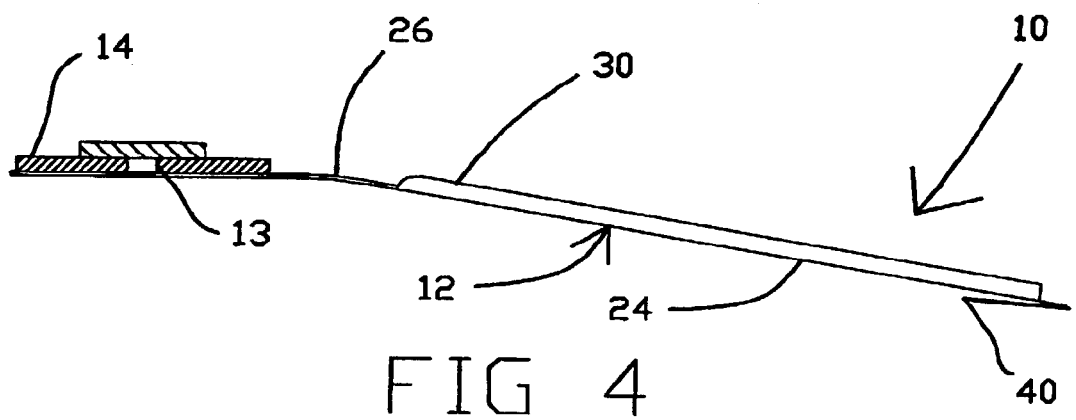
FIG. 4 is a side view of the suspension of the head suspension assembly of FIG. 2 (uninverted).
Figure 5:
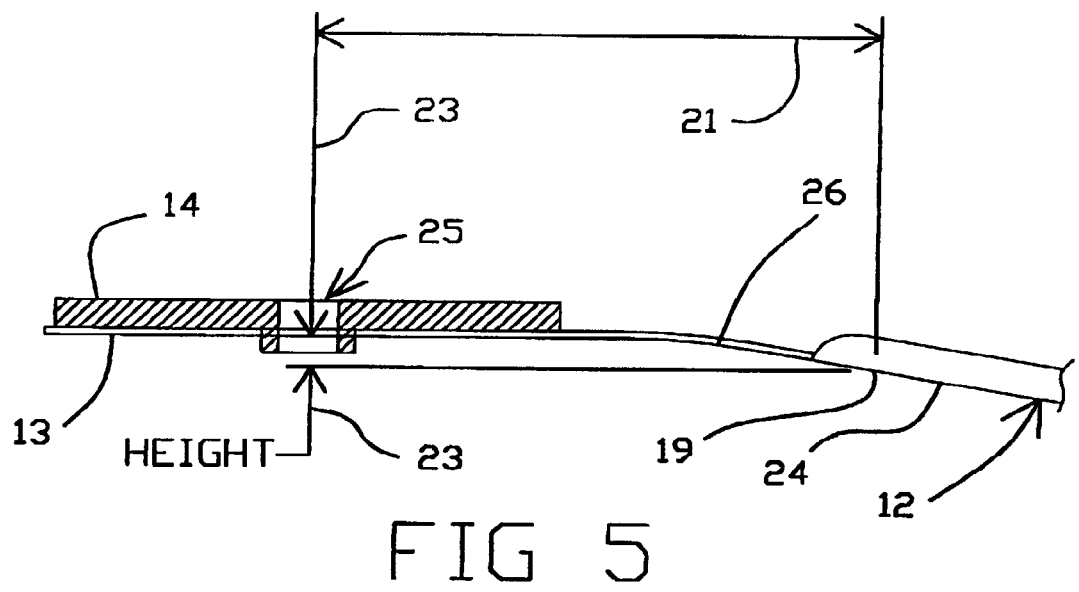
FIG. 5 is an enlarged fragmentary side view of the proximal end of the suspension shown in FIG. 4 to illustrate certain details of the spring region thereof.

As shown in FIG. 3, the products of these etching, forming and welding operations are carrier strips 34 with generally flat suspensions 10 extending therefrom (i.e., the mounting region 13, spring region 26 and rigid region 24 of load beam 16 are generally coplanar and at the same z-height). During subsequent manufacturing operations the spring region 26 of each load beam 12 is preferably rolled around a curved mandrel or otherwise bent in such a manner as to plastically bend or deform the spring region. As illustrated in FIGS. 4 and 5, this rolling operation imparts a curved side profile shape to the spring region 26 and causes the flexure 40 to be offset from the mounting region 13 in the z-height direction 26 when the suspension 10 is in its unloaded or free state. Equipment and methods for performing these rolling operations are generally known and disclosed, for example, in the Hatch et al. U.S. Pat. No. 5,471,734.

The result of forming the load beam 12 and assembling the flexure 40 and base plate 14 to the load beam 12 is shown in FIG. 4, where the relationship of the spring region to the reminder of the head suspension assembly 10 can be clearly seen.

High performance disk drive operation requires the air bearing head slider 22 to closely follow the rotating magnetic disk surface at a constant fly height. To meet this critical requirement, the gram load of the head suspension assembly 10 must be adjusted to a relatively tight specification range (defined in terms of upper and lower range specification gram loads above and below, respectively, the desired or nominal gram load).

Additionally, the radius geometry height (or RG height) is critical to proper operation of the head suspension assembly, particularly with respect to resonance characteristics, as has been mentioned above. As shown in FIGS. 5 and 5A, the RG height parameter is the z-height distance 17 between the surfaces of the load beam 12 at the mounting region 13 and a point 19 on the rigid region 24. The location 19 on the rigid region 24 at which the height is measured is referenced to the proximal end of the load beam 12 by a distance parameter referred to as the "height location" at a distance 21 from a reference location 23 which is usually the center of the boss hole 25 or tooling hole near the proximal end of the suspension 10.

Figure 5B:
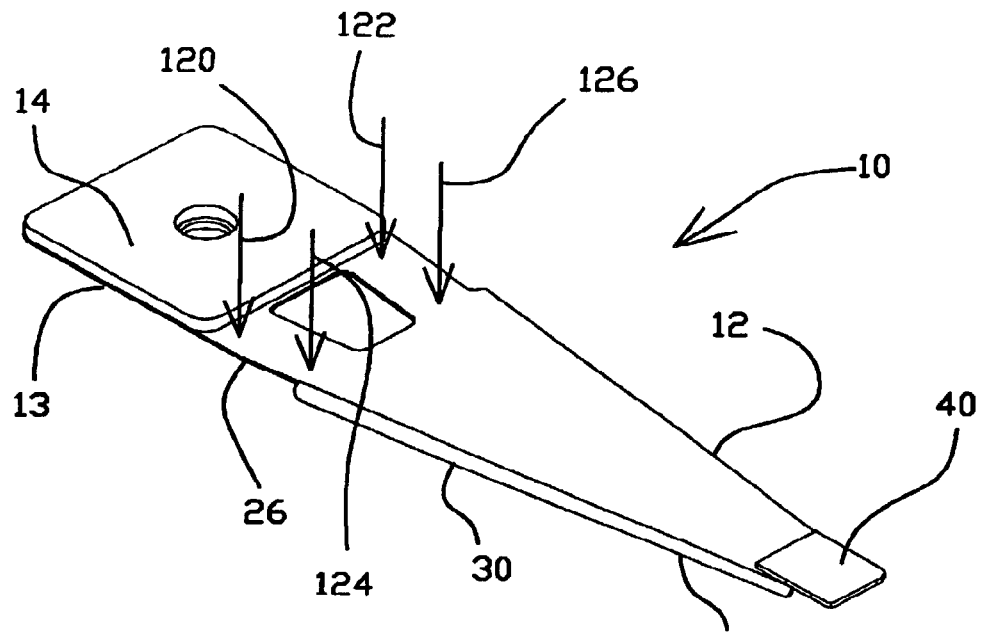
FIG. 5B is a perspective view of the suspension of FIG. 5A illustrating one location pattern for a four point RG height measurement process useful in the practice of the present invention.
Figure 5A:
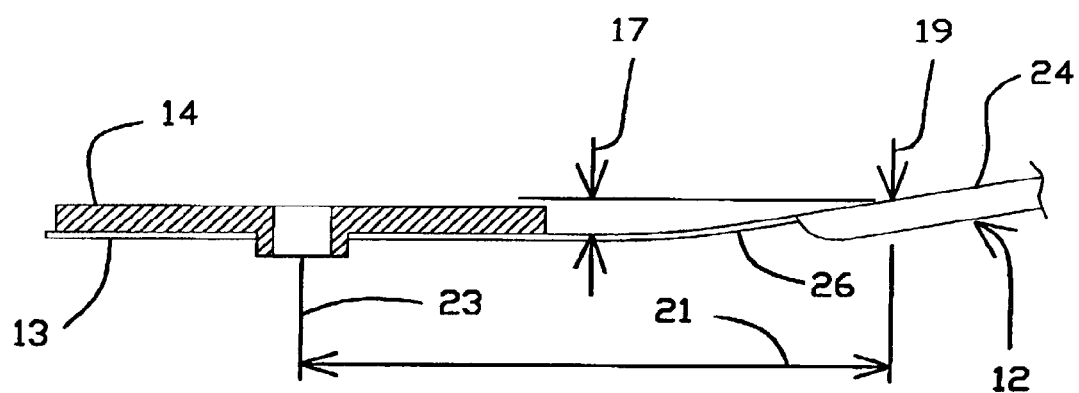
FIG. 5A is a fragmentary side view of an alternative version of the suspension in a "standard base" form having a baseplate on an opposite side of the suspension from that shown in FIG. 5.

It is to be understood that FIGS. 4 and 5 illustrate a "reverse base" type product and FIGS. 5A and 5B illustrate a "standard base" type product. It may be noted that the relative positions of the load beam 12 and base plate 14 are reversed between the standard base and reverse base type products.

To measure RG height, the suspension is clamped to a datum or reference level in the region of the suspension where the base plate is located. In at least one prior art approach, variations in the thickness of the base plate affected the measurement for the reverse base product because the load beam was spaced away from the datum level by the thickness of the base plate.

Figure 6:
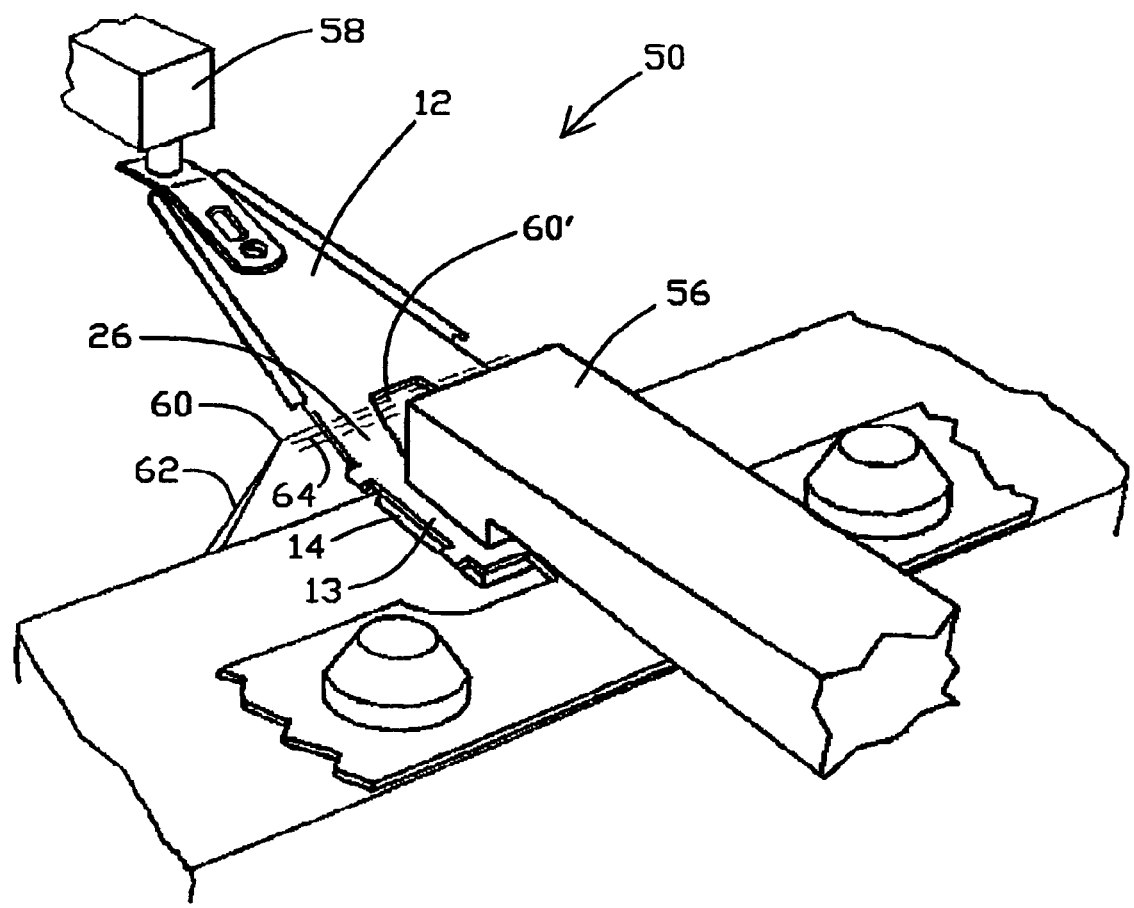
FIG. 6 is a is a simplified perspective view of the suspension in a measure and adjust station useful in the practice of the present invention.
Figure 7:
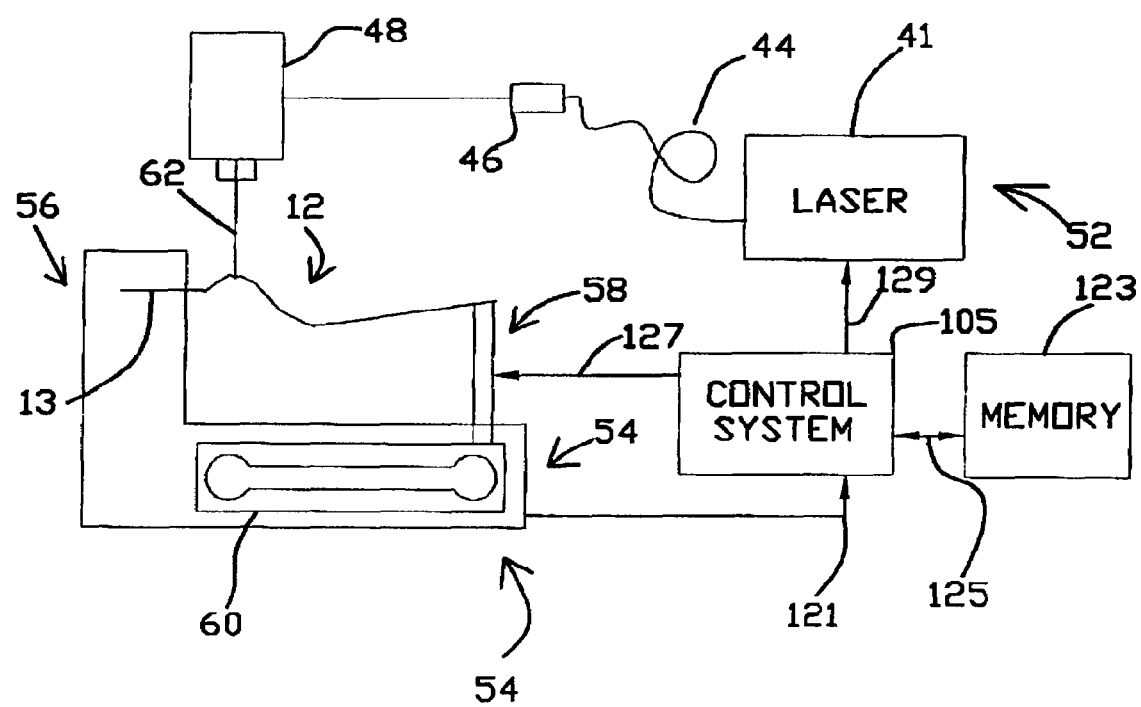
FIG. 7 is a simplified schematic view of the measure and adjust station of FIG. 6.

Referring now to FIGS. 6 and 7, an apparatus 50 and simplified block diagram 52 for positioning the load beam and applying laser scanning to the spring region of the load beam may be seen. A gram fixture 54 includes a clamp 56 holding the mounting region 13 of the load beam 12 at a desired position 57. A movable arm 58 positions the distal end of the load beam 12 to a desired position. The arm 58 is connected to a load cell to measure gram load. A laser 41 is connected optically via a fiber optic cable 44 and end optic 46 to a galvanometer 48. The galvanometer 48 directs the laser beam 62 across the spring region, as indicated by alternative position 60' in FIG. 6. It is to be understood that galvanometer 48 can be aimed to direct a laser beam 62 along one or more a scan lines 64 typically positioned on the spring region 26 and oriented transversely to the longitudinal axis of the load beam 12. An end optic 46 is composed of one or more lenses which collimate and size the laser beam coming out of the fiber optic cable 44.

In FIG. 7, clamp 56 releasably receives and clamps the mounting region 13 (preferably via the base plate 14) of the load beam 12 of the head suspension at a known elevation position by resting the flexure end of the suspension on a portion of arm 58. In this embodiment, the clamping system is preferably automatically actuated and the suspension is preferably automatically indexed. Movable arm 58 serves as a load beam engaging mechanism for engaging the load beam at a desired position (preferably corresponding to the fly height) with respect to the position of the mounting region. Arm 58 is a stem of a load cell 60. Laser source 41 is connected for scanning a laser beam 62 along a scan line 64 (see FIG. 6) across the spring region 26 of the load beam 12. A control system 105 has an input port 121 for receiving information representative of a measured gram load from the load cell 60. Control system 105 calculates the scan location and number of scans required to change the measured gram load to a desired or target gram load. The control system 105 sends scan information to the laser 41 and to the galvanometer 48 to execute the desired scans. Once the laser scans are executed, the gram load is measured again and if the gram load is within a specified tolerance range, the control system 105 stops adjusting the part. If the gram load is not within specifications, then one more "adjust routine" is executed. The control system 105 is also connected via a first means 125 to a memory 123 for accessing the memory as a function of the then currently measured gram load and radius geometry height values and the desired gram load and radius geometry height parameter adjust values. The memory 123 stores parameter adjust data representative of suspension gram load and radius geometry height. Control system 105 also is connected via a second means 127 to an actuator mechanism connected to arm 58 to position the arm 58 of the load beam 60 at the desired position. It is to be understood that the control system 105 actuates the laser source 41 to concurrently achieve desired gram load and radius geometry height for the suspension undergoing adjustment.

Figure 8:
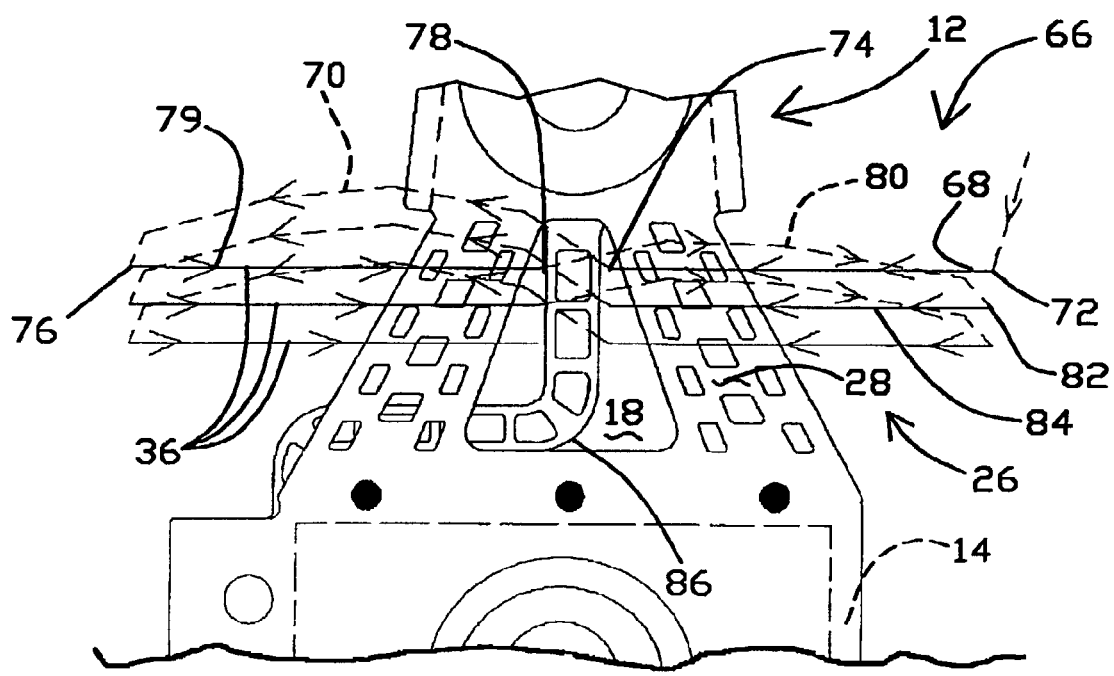
FIG. 8 is a fragmentary plan view of a spring region of a suspension showing various details of the scan lines aspect of the present invention.

Referring now also to FIG. 8, a pattern 66 of scan lines 36 may be seen. In operation, the laser 41 is turned on, and the galvanometer 48 directs the laser beam 62 along an initial scan segment 68, preferably moving from a first position 72 laterally outboard of a first spring arm 28 to a second position 74, preferably located in a central aperture 18 in the spring region 26. The laser 41 is then turned off and the galvanometer 48 then repositions the laser beam to a third position 76, by moving through a jump segment 70. The laser 41 is then turned on, and the laser beam 62 is moved through a second scan segment 79, extending from third position 76 to a fourth position 78, at which time the laser beam is located in the central aperture 18 and is turned off. The galvanometer 48 is then redirected along a second jump segment 80 to reposition the laser beam 62 to a fifth position 82, after which the laser 41 is turned on and scanning continues as illustrated along scan segment 84. Operation continues along predetermined scan and jump segments as illustrated. In the operation shown in FIG. 8, scan segment 84 corresponds to a center scan location, since there is one scan segment or scan line on either longitudinal side of scan segment 84. It is to be understood that a greater or lesser number of scan lines may be used in the practice of the present invention, and that the central aperture may be omitted, or more apertures utilized in the practice of the present invention. It is to be further understood that the center scan location on the left leg may be different than the center scan location on the right leg. The load beam shown is for a Q30D type product, manufactured by Hutchinson Technology, Inc. In this product the electrical traces 86 are located along the longitudinal axis of the load beam 12, and scanning is interrupted to avoid irradiating the traces with the laser beam 62. For designs with off-axis trace routing, a continuous scan line can be used to create the scan pattern. The scan pattern is made up of a group of scans centered about a given center scan location, with other scans longitudinally offset by a predetermined distance, usually fixed. Coarse scans are initially performed, and may optionally be followed by fine scans in the same region that the coarse scans are applied.

In a preferred embodiment, laser beam 62 is a continuous wave, focused laser beam which traverses and irradiates the spring region 26 to impart heat energy to the load beam and to provide precise adjustment of that portion of the spring region irradiated. Laser beam 62 preferably has a focused diameter of 30 micrometers.

A continuous wave fiber laser such as is available from SDL, Inc., of San Jose, Calif., model number SDL-FL20-4211-001, is preferred for laser 41, and a focused spot size diameter of between about 15 and about 60 micrometers have been found to be useful in the method of the present invention. Other lasers, such as, but not limited to an SDL FL 10 laser may be used in the practice of the present invention, as desired. Higher power levels have been found desirable to obtain more part response per scan line. However, such higher power levels can also result in discoloration of the part being scanned. To avoid discoloration, it has been found desirable to introduce an inert gas, preferably nitrogen, into the area where scanning is performed. To avoid mechanically disturbing the part being scanned, the inert gas atmosphere is preferably introduced indirectly, with one arrangement calling for introduction of 200 cubic feet per hour into the shroud around the part to be scanned, on each side, through ¼ inch tubing, taking care to avoid directing the flow at the part to be scanned.

In the region scanned by the laser, an elevated temperature isothermal is created on the irradiated surface along the path or scan line that the laser traverses. The scan line region is constrained by the cooler material surrounding the scanned area causing it to yield in compression. In this manner, the surface of the material irradiated will "curl" or bend towards the laser beam upon cooling. Through the selective scanning of the spring region, the spring region can be caused to bend in a predetermined and desired manner, which will in turn provide a desired adjustment to both the gram load and radius geometry height of the head suspension 10.

It is to be understood that the load beam is preferably initially formed with the spring region intentionally formed to an "overgram" condition, such that the gram adjust procedure performed in the practice of the present invention is used to reduce the gram load. The direction of RG height change is dependent on the scan location. To decrease RG height, the scans are located between the base plate 14 and the low point location. To increase RG height, the scans are located between the low point location and the rigid region 24. It has been found preferable with the one-sided gram adjust to have a minimum gram adjust for obtaining a maximum RG height adjustment. Typically, for every 20 milligram change in a gram load, 1 μm change is possible in RG height. However, it is to be understood that such adjustment parameters are dependent on material type, thickness, and width, part design and laser specifications.

It has been found preferable to make the length of the spring region 26 in the longitudinal direction 1.5 mm for full thickness load beams, and about 0.8 mm for load beams having a partially etched spring region. Other values may be used, depending upon the amount of adjustment required. The location of the bend radius affects the range in the positive or negative direction for adjusting Radius Geometry height. For equal ranges, the low point location is preferably located in the middle of the spring region. It is to be understood that the area available for scanning is a factor in determining the adjustment range.

In the practice of the present invention it is desired that each individual load beam will be rolled to a higher than desired gram load in a conventional forming machine. The entire radius region is then preferably stabilized using a diode laser to bulk heat the spring region rolled. This is done to keep the gram creep during the bake test the same as what would be expected if the entire part was heat treated to stabilize it. The load beam can be subjected to intentional back bending after the rolling operation and prior to laser stabilization to reduce suspension gram load loss at the time of head stack assembly. It is to be understood that this intentional back bending takes place prior to processing according to the present invention, when the load beam is elevated to the offset height in a machine 90 which adjusts dynamic gram and height (the "DAGH" or Dynamic Adjust Gram and Height station). It is to be further understood that elevating the load beam to the offset height does not cause suspension gram loss in the short term.

The amount of scanning performed on the head suspension, and thus the amount of adjustment that is obtained, is dependent upon a number of variables, each of which can be controlled as needed by a desired application to optimize the scanning process. One constraint on the amount of scanning performed on a head suspension in a compensation process is the amount of correction that is needed to overcome errors in the gram load and radius geometry height of the head suspension. A second constraint on the amount of scanning performed is that the head suspension is preferably not permanently marked during the correction process, which will diminish the aesthetic appearance of the part. In FIG. 8, the head suspension is scanned with a plurality of lines using a laser beam having a predetermined size and intensity. Moreover, the plurality of scan lines are spaced apart to control the amount of localized heat applied to the head suspension at each of the individual lines, and the rate at which the laser traverses the head suspension in scanning the scan regions is controlled in a desired manner to control the amount of heat applied to the head suspension. Finally it has been found desirable to identify the location of the portion scanned by reference to the center scan line location, in addition to the number of scan lines. In other words, the amount of scanning performed on a head suspension will vary with the size and intensity of the laser beam, the spacing between the lines scanned by the laser beam, the number of lines scanned by the laser, the location of the center scan line and the rate at which the lines are scanned. It is to be understood that this reference to center scan (line) location is directly applicable to scans of odd numbers of lines, and, in principle, to the average or mean of an even number of scan lines.

The physical configuration of the arms 28 of the spring region 26 of the head suspension (i.e. part width and thickness) will also play a part in the amount of angular deflection the head suspension experiences for a given amount of scanning. For a specific suspension configuration, the beam size, intensity, number of scan lines, and scan rate can be optimized as necessary to induce the proper amount of correction while not permanently marking the head suspension part.

The amount of scanning that needs to be performed on a head suspension to effect a desired adjustment of gram load and radius geometry height is experimentally obtained and stored for later reference by holding certain of the variables described above that affect the heat imparted to the component constant while varying other variables. For example, using the head suspension of FIG. 8 to illustrate wherein a plurality of lines 36 are scanned in the head suspension, the focused beam size of the laser used to scan lines 36, the spacing between individual lines 36, and the sweep rate and laser power at which the head suspension is scanned can all be held constant, while the number of lines 36 that are scanned, and thus the size of scan portion 34, is varied to experimentally determine the deflection obtained from a given number of lines that are scanned in a specific portion of region 26. The resulting change in gram load and radius geometry height is then measured and response curves depicting gram load and RG height changes as a function of the number of scan lines for a scan array and location on the top surface 42 of the spring arms 28 for a given laser beam size and scan rate for a given suspension model can be obtained.

Figure 9:
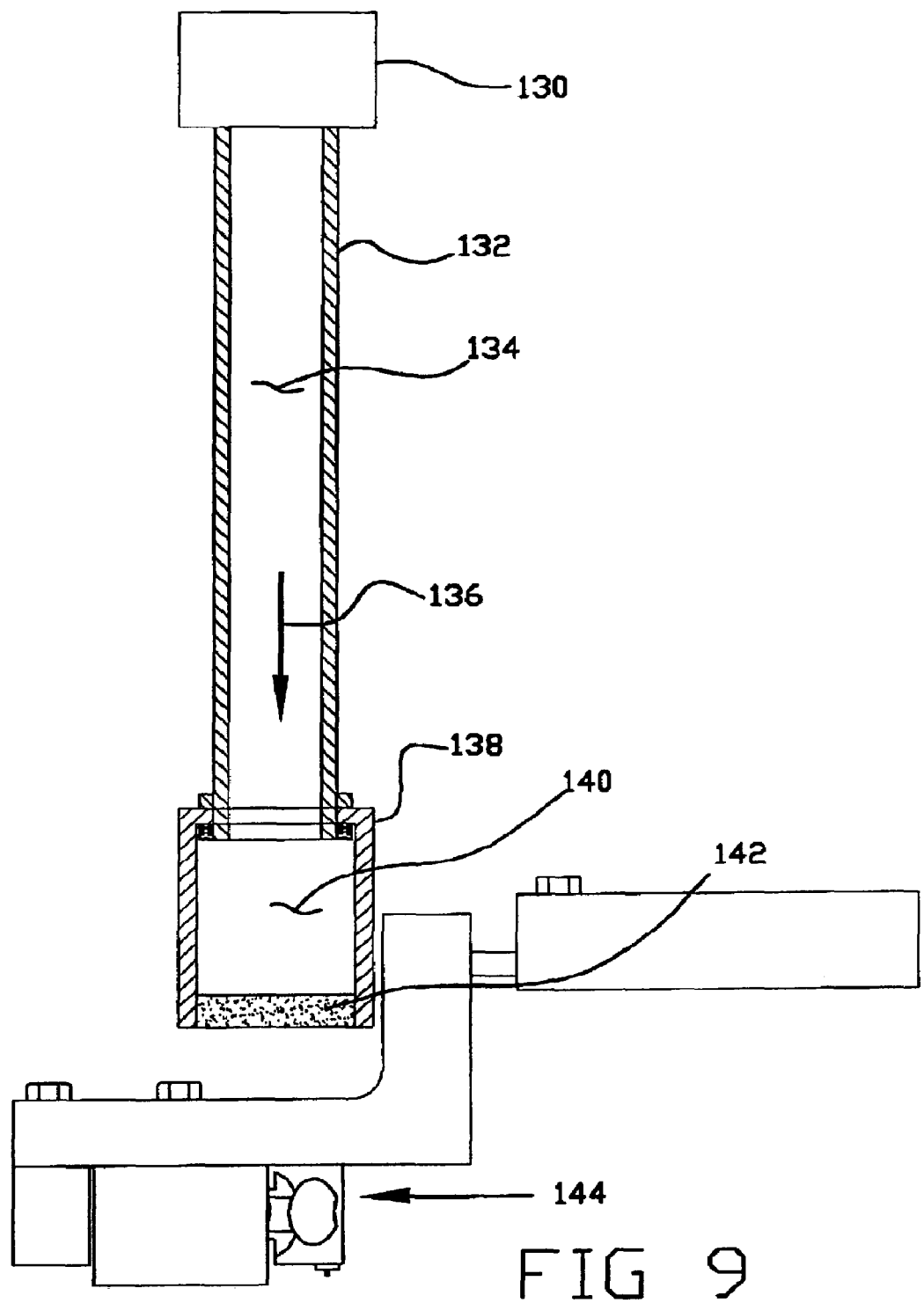
FIG. 9 is a simplified view of apparatus useful in introducing an inert gas atmosphere in the practice of the present invention.

Referring now most particularly to FIG. 9, a simplified view of apparatus for introducing the inert gas may be seen. A source 130 of inert gas, such as nitrogen, provides the gas through a conduit 132 having a lumen 134 in the direction of arrow 136. A housing 138 is connected to conduit 132 and forms a laminar flow chamber 140 having a plug 142 of porous stainless steel at an outlet thereof to provide a diffuse flow of the inert gas indirectly to the region of the head suspension scanned by the laser near the load cell assembly 144. The porous stainless steel plug 142 is preferably of the type commonly available from Mott Corporation, Pyramid Technologies, or Purolator, and may be a sintered metal filter or flow restrictor.

Figure 10:
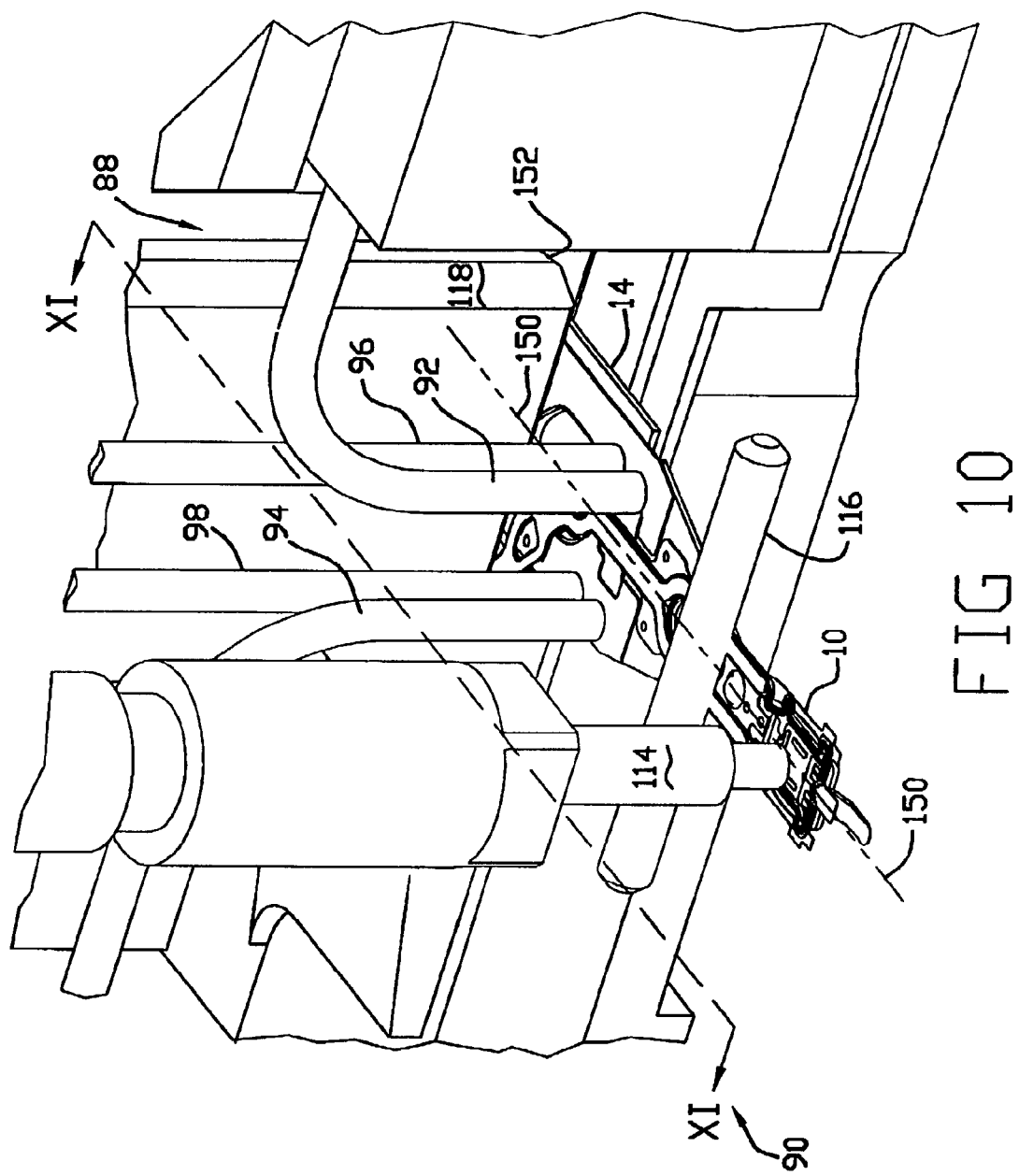
FIG. 10 is a fragmentary perspective view of a four point measurement system with parts omitted to illustrate certain details useful in the practice of the present invention.
Figure 11:
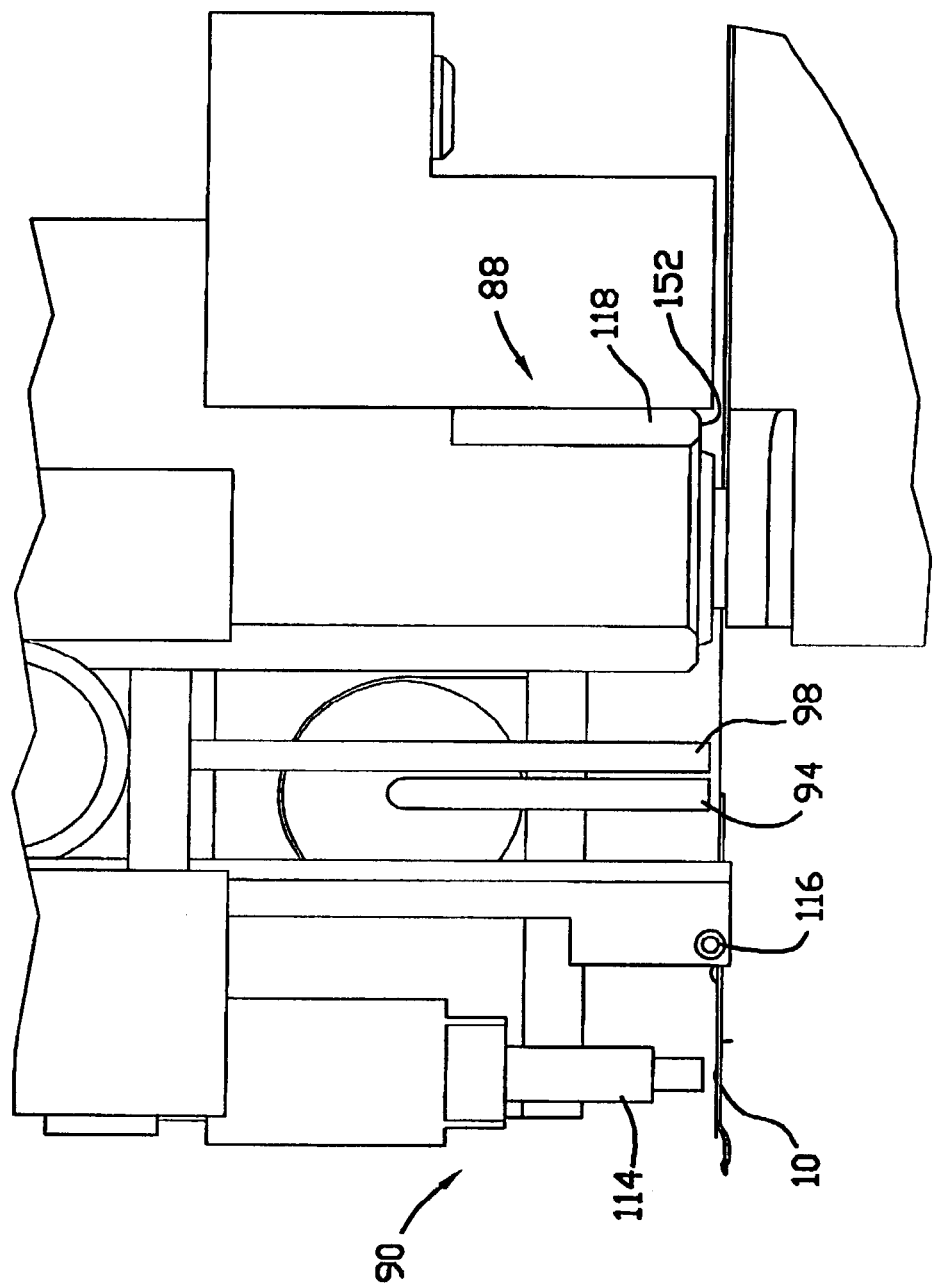
FIG. 11 is a side view of the measurement system of FIG. 10 taken along line XI—XI of FIG. 10 with parts removed for illustrative purposes.
Figure 12:
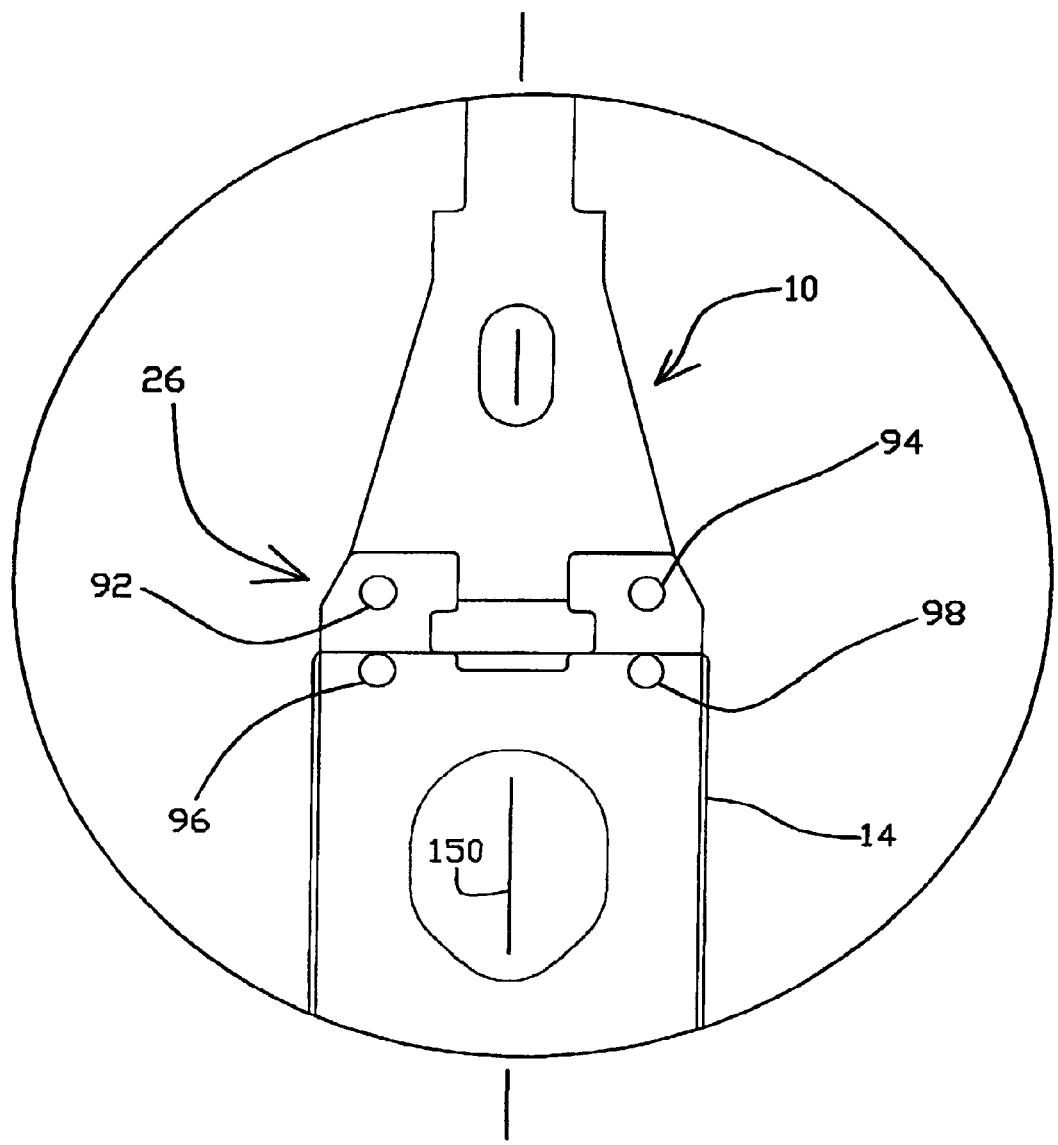
FIG. 12 is a detail plan view of the positioning of four sensors with respect to a portion of the head suspension being measured by the measurement system of FIGS. 10 and 11.

Referring now to FIGS. 10 and 11, a simplified view of a displacement measurement system 88 in the form of a DAGH station 90 useful in the practice of the present invention may be seen. As shown in FIGS. 10 and 11, parts are omitted to show the orientation of a plurality of sensors 92, 94, 96, and 98 and a top base clamp 118 with respect to the head suspension 10 undergoing processing in station 90. FIG. 12 shows a plan view of a portion of the head suspension to illustrate the preferred location of the sensors 92, 94, 96, and 98 with respect to the head suspension 10. System 88 preferably determines RG height using the four point measurement technique described previously with respect to FIG. 5B. Station 90 preferably includes four non-contacting sensors 92, 94, 96, and 98. It is desirable for all four sensors to be operated simultaneously to obtain simultaneous, real-time measurement of the part. It is also desirable that measurements are taken from the part with one or two of the sensors providing reference data to eliminate material thickness and clamping variation effects on the measurements taken.

The four points of the system 88 can be arranged in a variety of configurations. FIG. 12 shows a preferred configuration for a particular type of suspension, with RG height and delta RG height being determined for the suspension 10 under test using the either of the following formulas:

$$\text{Delta } RG \text{ height} = (P1-P3)-(P2-P4) \quad (1)$$

$$\text{Delta } RG \text{ height} = (P1-P2) \quad (2)$$

where P1 is the measurement by sensor 92 of the distance from the end of the sensor to the suspension 10 at location 92 in FIG. 12, and P2, P3, and P4 are the corresponding respective distances measured by sensors 94, 96, and 98 at the respective locations indicated in FIG. 12. It is to be understood that in this aspect of the present invention, not all the locations need be on the same material. For example, P1 and P2 could be on the flexure, and P3 and P4 on the load beam. FIGS. 10 and 11 show a load cell stem 114 which may be used to measure gram load for the suspension 10. An elevator 116 may optionally be used to bring the suspension 10 to a position near the assembly offset height before the load cell stem 114 is placed on the suspension 10. The suspension 10 may be held by a base clamp 118 acting against the region of the suspension containing the base plate 14. The above described apparatus may thus be seen to be suited for measuring a radius geometry height of a head suspension using clamp 118 to secure a base plate region of the head suspension 10 in a fixed position, along with a first sensor (such as sensor 96) providing a first output representative of a distance between the first sensor and the head suspension 10 at a first position (96 in FIG. 12) proximal a region of the base plate 14 of the head suspension 10 and using a second sensor (such as sensor 92) providing a second output representative of a distance between the second sensor and the head suspension at a second position (92 in FIG. 12) located a predetermined distance away from the first position. As may be seen in FIGS. 10 and 11, the first and second sensors are located on the same side of the head suspension 10. The radius geometry height for the suspension 10 is measured by subtracting the first output from the second output, it being understood that the first and second sensors may be located laterally at other positions than those shown in FIG. 12, including positioning sensors 92 or 96 (or both) along a centerline of the suspension if there is no aperture interfering with such positioning. As has been stated, the first and second sensors are preferably non-contacting sensors and are also preferably located such that their measurement is made from a common plane. In other words, the method of measuring radius geometry height for a head suspension in the practice of the present invention includes clamping a base plate region of the head suspension at a fixed position, measuring a first distance to the head suspension at a first position proximal the base plate region of the head suspension, measuring a second distance to the head suspension at a second position located a predetermined distance away from the first position, and determining a radius geometry height for the head suspension by subtracting the first distance from the second distance.

Figure 13:
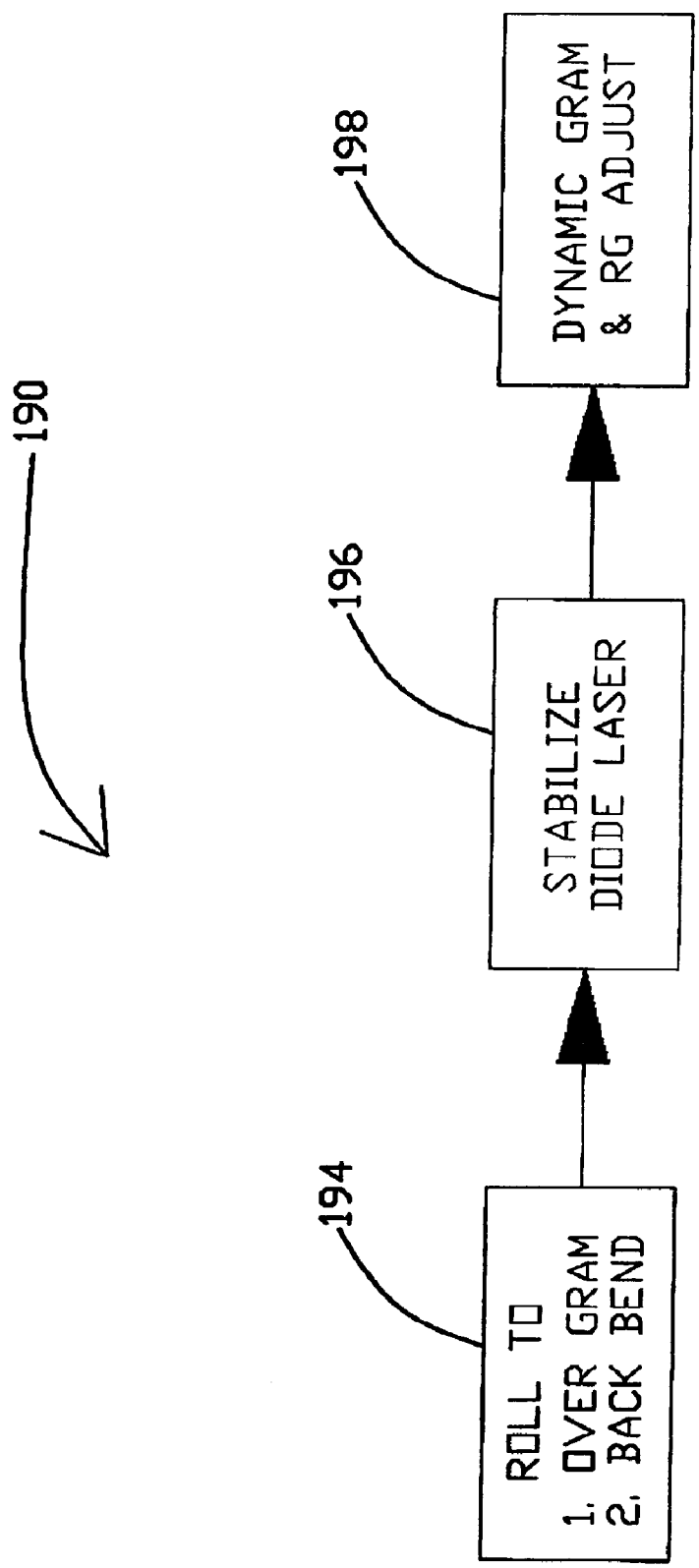
FIG. 13 is a high level simplified block diagram for the process of the present invention.
Figure 14A:
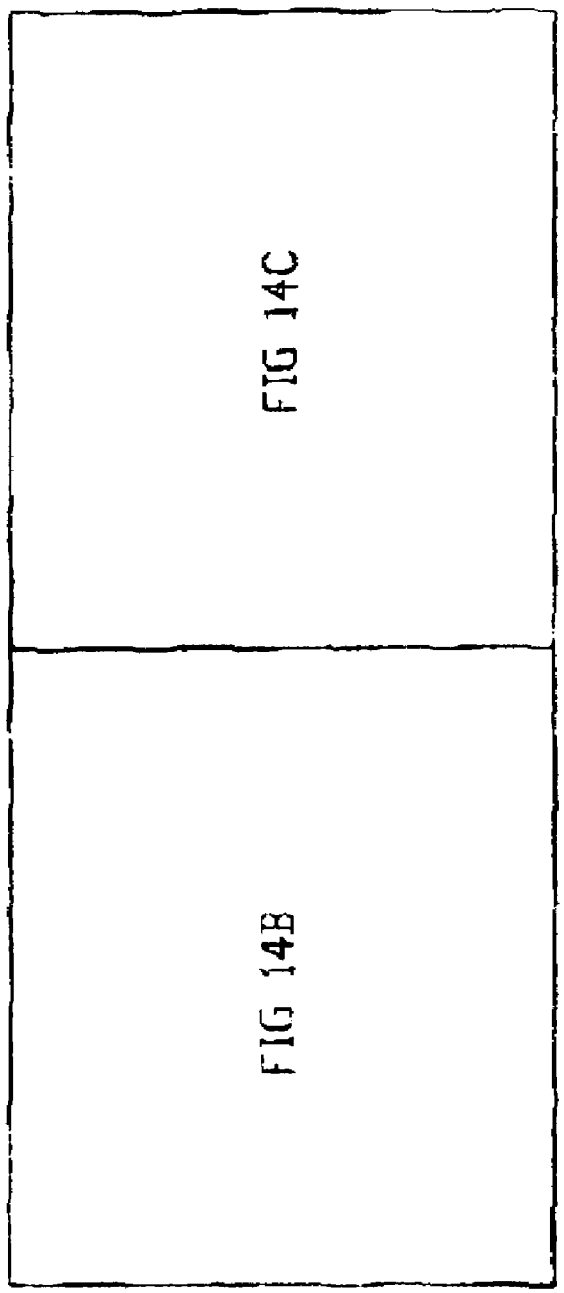
FIG. 14A is a key for FIGS. 14B and 14C.

Referring now to FIG. 13, a basic block diagram 190 and a detailed flow chart 192 for the process of the present invention may be seen. In block diagram 190, the first step 194 in the process of practicing the present invention is to roll the load beam to an "over gram" condition where the gram load is in excess of the desired final gram load and performing back bending is desired. The next step 196 is to stabilize the rolled load beam by irradiating with a bulk heating diode laser. The final step 198 is to perform a dynamic gram and radius geometry (RG) height adjustment on the load beam. FIG. 14A is a key, and FIGS. 14B and 14C together illustrate a flow chart for the dynamic gram and RG height adjust process. The process is set to do a maximum of two adjust attempts per part, a coarse adjust and a fine adjust. If the computed fine scans do not fall within the boundaries defined by the previously scanned coarse scans, the fine scan location is forced to fall within the coarse scan bounds. By doing this, some RG height adjustment capability is sacrificed, because, to get fine adjustments, either the ratio of power to velocity must be modified, or the area scanned previously needs to be scanned. It has been found preferable to scan in the area already scanned, to reduce control logic complexity. Nevertheless, it is to be understood to be within the scope of the present invention to adjust the power to velocity ratio of the laser beam, as an alternative for fine adjustments.

Figure 14B:
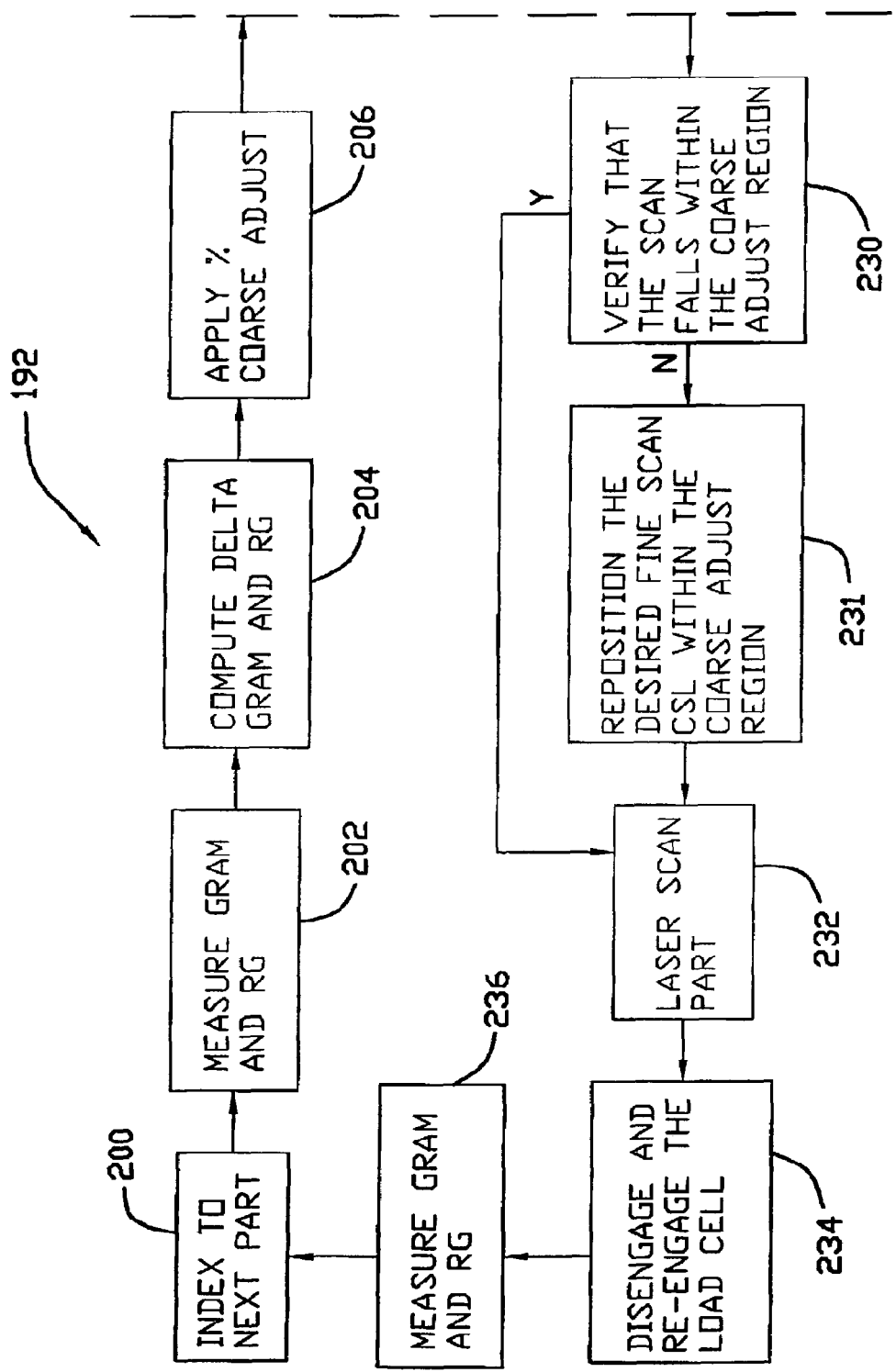
FIG. 14B is a first portion of a flow chart showing more detail of a first embodiment of the process of the present invention.
Figure 14C:
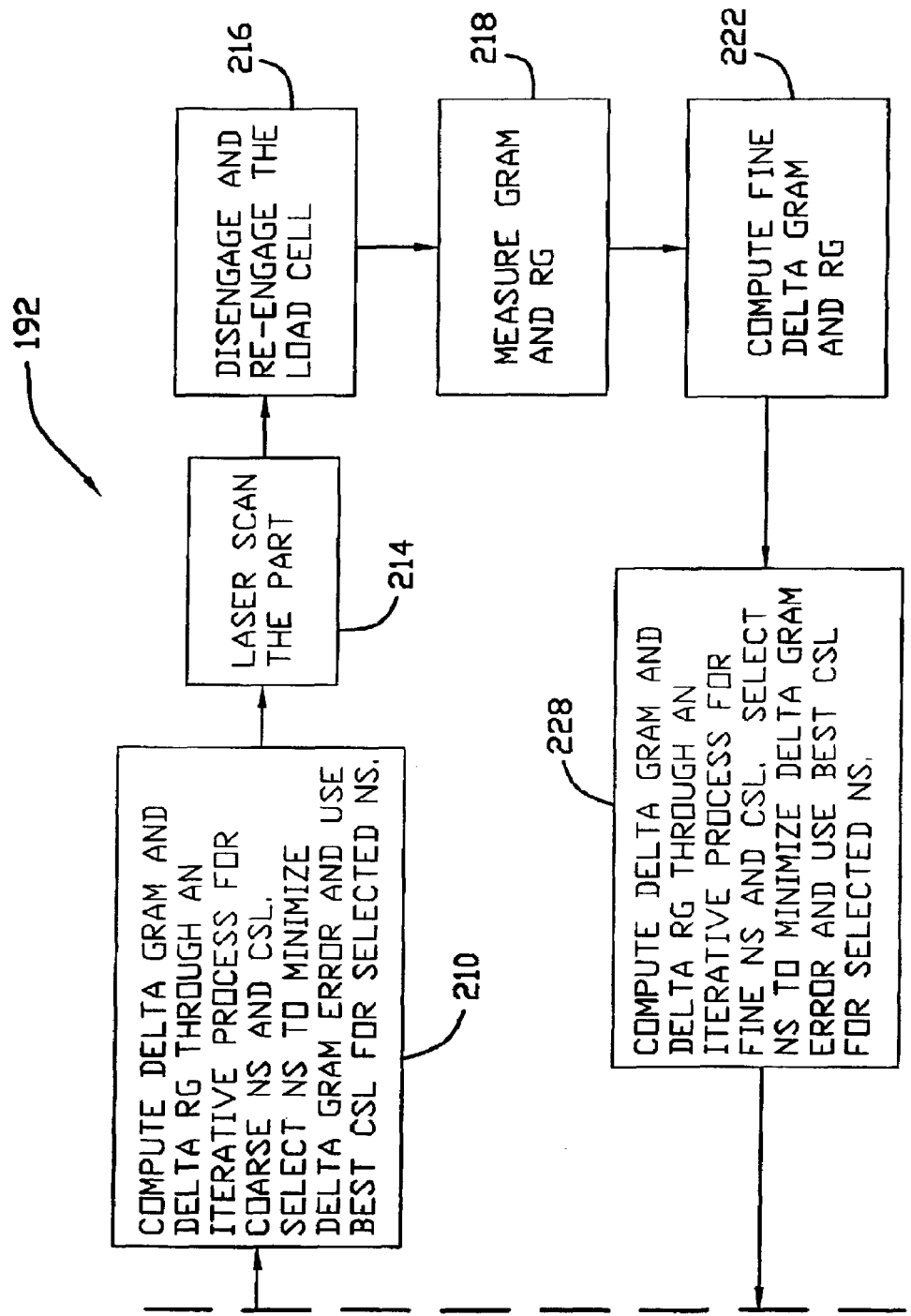
FIG. 14C is a second portion of the flow chart of FIG. 14A.

RG could be a few micrometers off the target. In FIG. 14B, the process for a first embodiment of the present invention begins at block 200 where the system indexes to the first or next part. At block 202 the initial gram load and RG height is measured. A pair of delta gram and RG values are computed in block 204, after which desired percentage of the overall gram and RG height adjustments are applied in block 206. Referring now also to FIG. 14C, in block 210 the number of scans (NS) and the center scan location (CSL) are computed. This is done through an iterative method for all possible number of scans that can be physically performed within the hinge region of the suspension. The number of scans that produces the least delta gram error is used along with the best CSL for minimizing delta RG error. The part is then scanned, as indicated in block or step 214. The loadcell is cycled in block 216, and the part is measured for gram load and RG height in block 218. Fine delta gram and RG height values are computed in block 222. The number of fine scans and the fine center scan location are computed in step 228, and the result is checked to see if the fine scans fall within coarse adjust region in block 230 (referring again to FIG. 14B). If yes, the part is scanned in a fine scan operation indicated by block 232. If no, the fine scans are positioned within the coarse adjust region in block 231. It is to be understood that in repositioning the desired fine scan CSL within the coarse adjust region, some height adjustment is sacrificed in view of the greater importance of achieving a desired gram load. After the part is repositioned in block 231, the part is scanned in block 232. The load cell is cycled in block 234. Finally, the part is measured for gram load and RG height after fine scan in block 236.

While it is possible to repeat scanning more than twice per part, it is preferable to limit the number of scan cycles to two, so as to avoid significantly reducing the production rate for processing parts using the present invention.

The DAGH station 90 will adjust parts to the nominal gram by decreasing gram on the incoming (overgrammed) parts. For partially etched load beams, the change in gram per laser scan line will be more (at equal laser power) due to the decreased material thickness for such parts.

In the practice of the present invention, it has been found preferable to develop response curves for each type of load beam or head suspension product to be adjusted by the method of this invention. In effect, the algorithm "memorizes" the center scan location and number of scans necessary to provide a desired combination of gram load and RG height adjustments. The change in RG height is a function of scan location and number of scans. It is to be understood that by "scan location" is meant the location of the center of a group of scans with reference to the top (flexure side) of the cut out of the spring region. It is to be understood that the adjustment range for gram load an RG height according to the present invention is affected by power and velocity combinations ($P/V^{1/2}$), focus spot size, scan offset and material properties, particularly material thickness.

Figure 15:
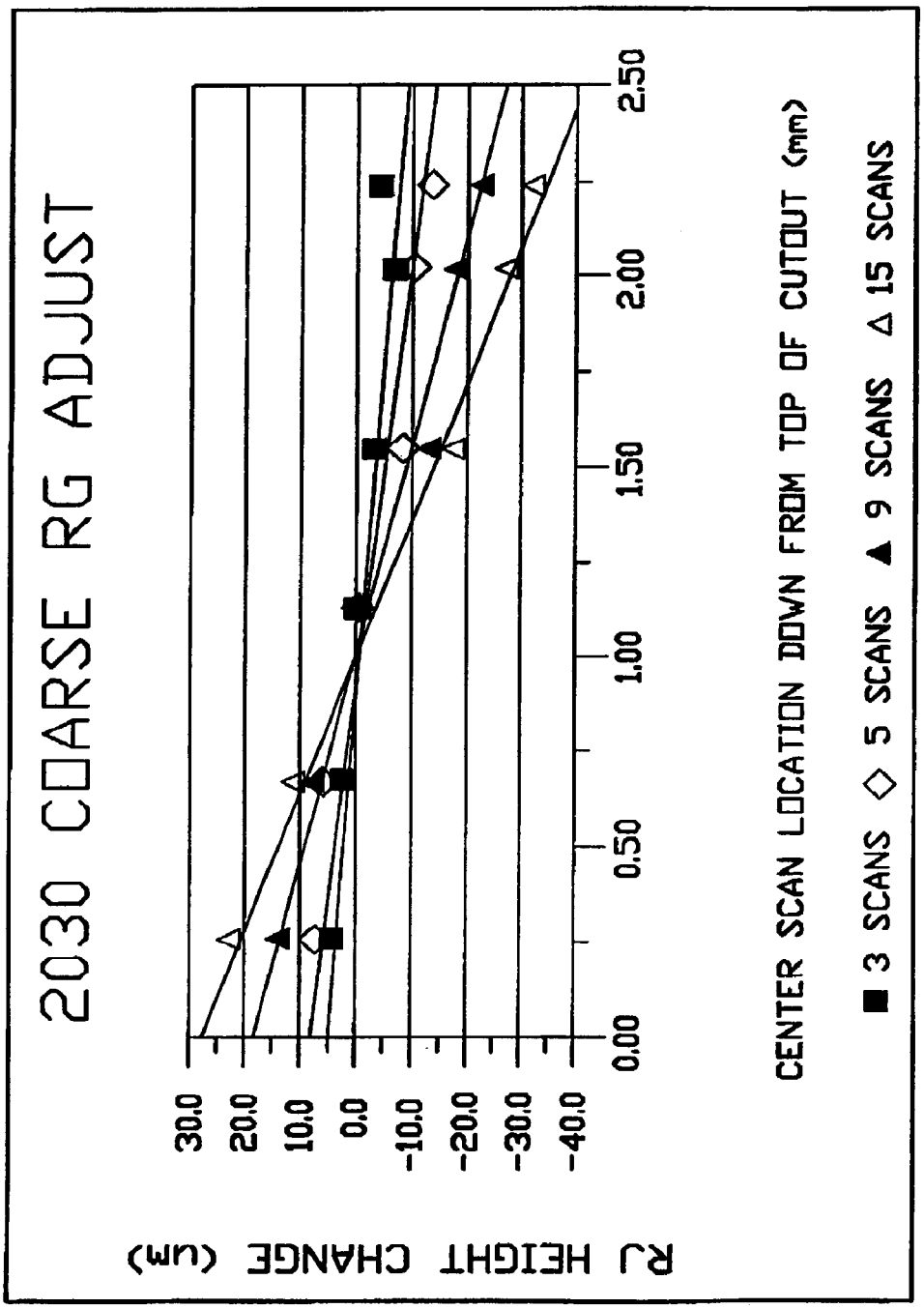
FIG. 15 is a plot of coarse RG adjust data showing RG height change versus center scan location for 3, 5, 9, and 15 scan lines for a model 2030 suspension.
Figure 16:
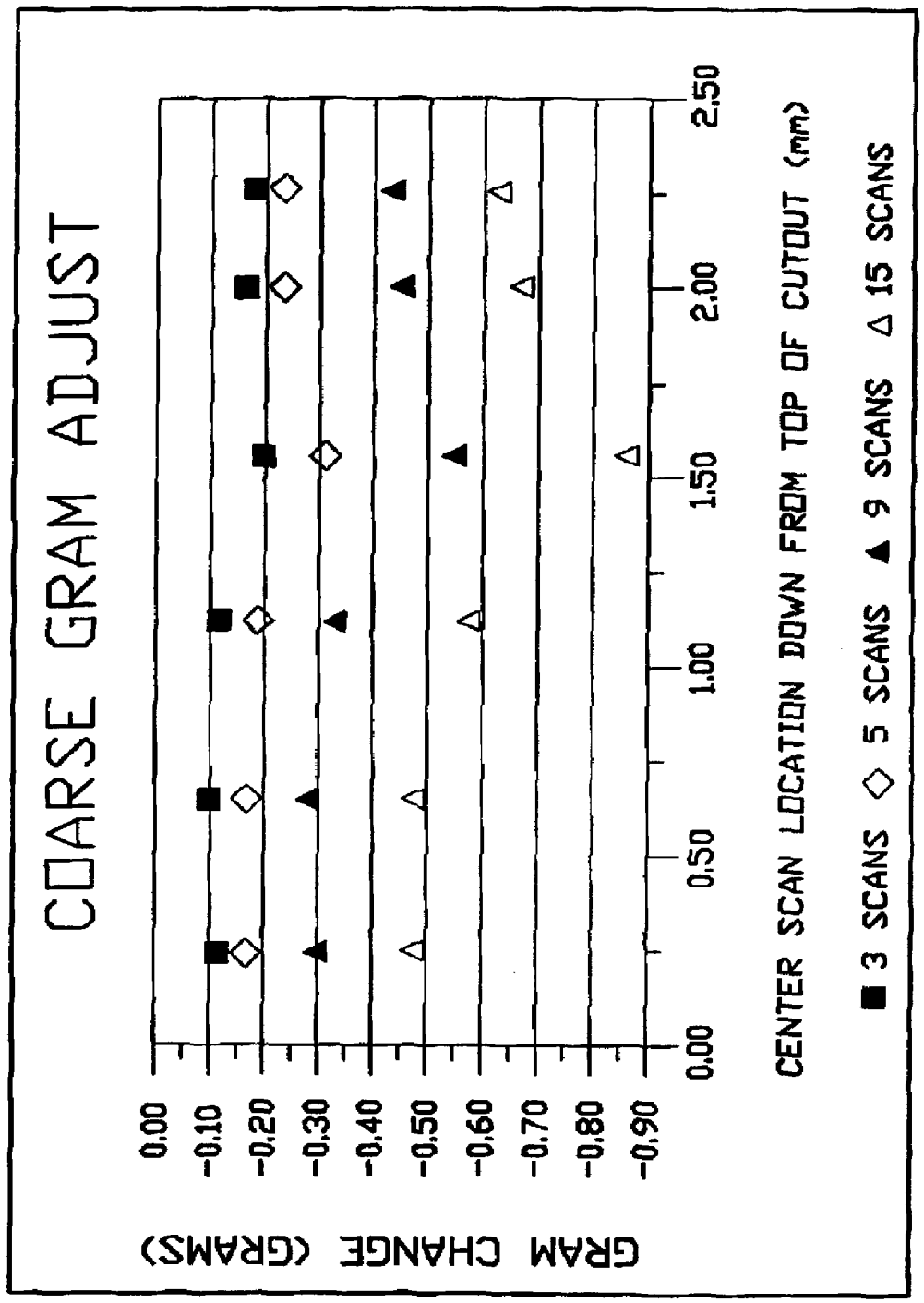
FIG. 16 is a plot of coarse gram adjust data showing gram change versus center scan location for 3, 5, 9, and 15 scan lines for the model 2030 suspension.

Referring to FIGS. 15 and 16, the coarse RG adjust and coarse gram adjust data (for 3, 5, 9 and 15 scan lines) versus center scan location may be seen for a model TSA2030 head suspension offered by Hutchinson Technology, Inc. These response curves represent the change in RG or gram as function of scan location with the number of scans included as a parameter. For a given number of scans, the RG height change varies linearly with scan location. It is also to be noted that the RG height change can be positive or negative, depending upon the region in which the scans are applied. If the scans are located between the mounting plate and the center of the bend, the RG height can be reduced. If the scans are located between the center of the bend and the rigid region, the RG height can be increased.

Since the relation between the RG height and center scan location (CSL) is linear for a given number of scans, the RG height change for a given number of scans can be expressed as:

$$\text{Delta}_{RG} = \text{Intercept}_{CSL} + \text{Slope}_{CSL} \times CSL \quad (3)$$

The Intercept$_{CSL}$ and Slope$_{CSL}$ are each a function of the number of scans performed. Therefore, they can be expressed as:

$$\text{Intercept}_{CSL} = Mc \times (\text{Number of Scans}) + Cc \quad (4)$$

where Mc is the Slope of the Intercept$_{CSL}$, and Cc is the Intercept of the Intercept$_{CSL}$ and $$\text{Slope}_{CSL} = Mm \times (\text{Number of Scans}) + Cm \quad (5)$$

where Mm is the Slope of the Slope$_{CSL}$, and Cm is the Intercept of the Slope$_{CSL}$.

This allows Equation (3) to be rewritten as:

$$\text{Delta}_{RG} = Mc \times (\text{Number of Scans}) + Cc + [Mm \times (\text{Number of Scans}) + Cm] \times CSL \quad (6)$$

Equation (4) can be further simplified by forcing Cc and Cm to 0. This can be done without making a significant compromise in accuracy, since (Number of Scans)=0 when there is no change. In that situation, Equation (6) can be rewritten:

$$\text{Delta}_{RG} = Mc \times (\text{Number of Scans}) + Mm \times (\text{Number of Scans}) \times CSL \quad (7)$$

Similarly, gram change can be plotted as a function of number of scans and scan location. FIG. 16 shows gram change as a function of scan locations for different numbers of scans. It may be noted that the relationship between gram change, delta gram and CSL is not linear. This is primarily due to the variation in the residual stress due to gram rolling and induced stress due to elevating the part to the offset height. The region at which the load beam is bent has the highest compressive residual and induced stress on the non-trace side. This aids the laser bending process of the present invention and hence the maximum gram change at that location.

Figure 17:
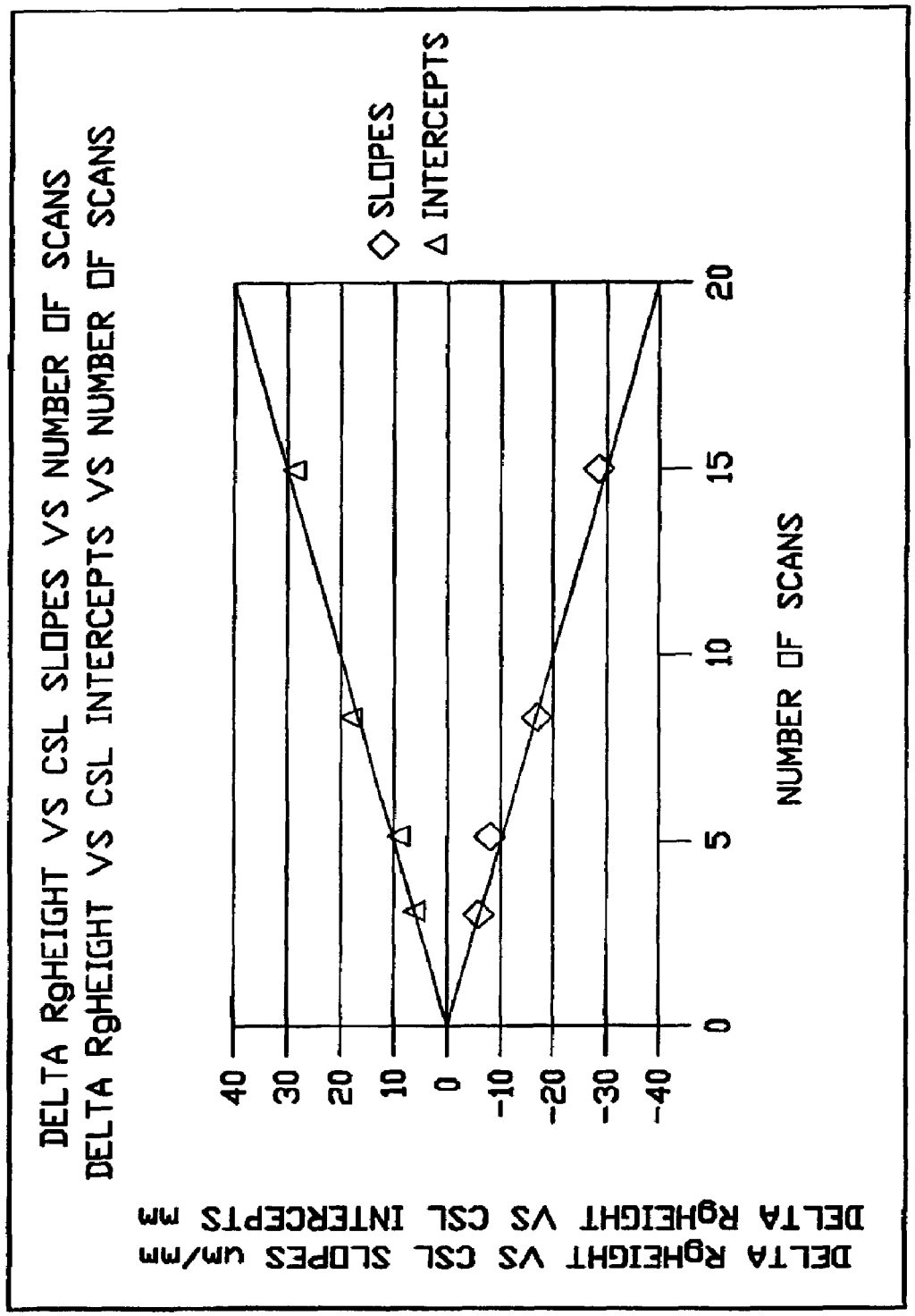
FIG. 17 is a graph illustrating Delta RG Height versus Number of Scans for both the slopes and intercepts of CSL.
Figure 18:
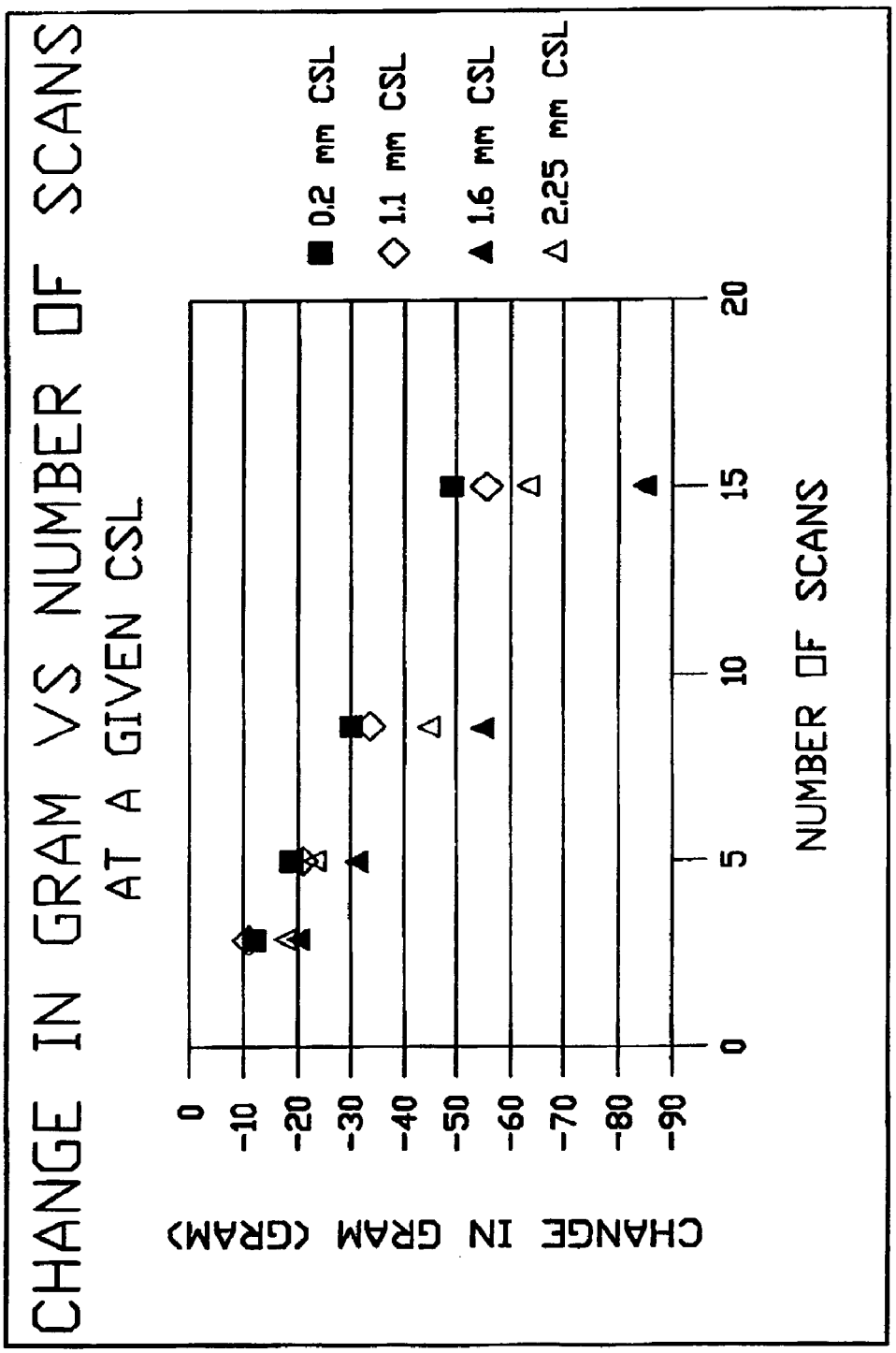
FIG. 18 is a graph illustrating Change in Gram vs. Number of Scans, with CSL as a parameter.
Figure 19:
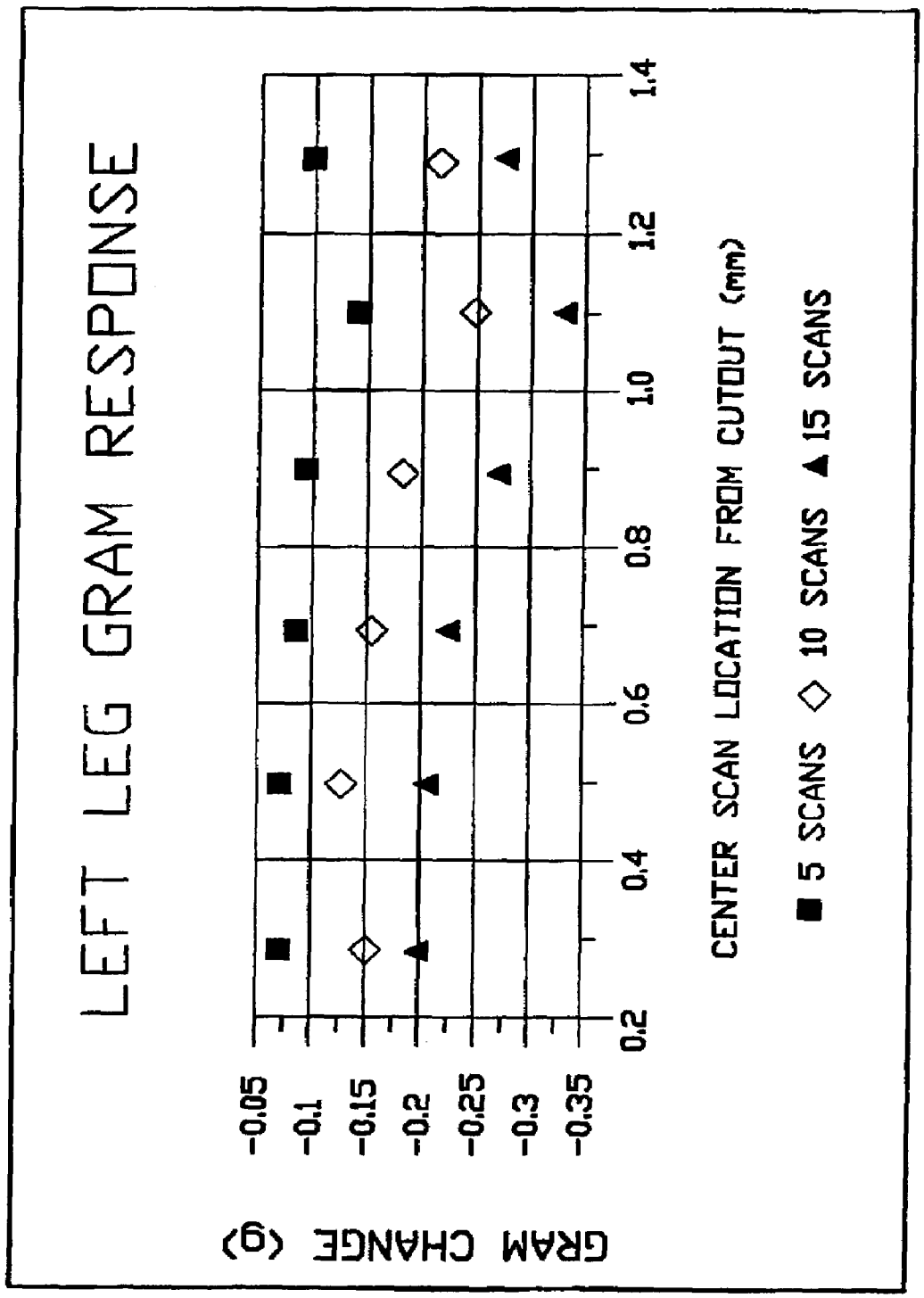
FIG. 19 is a plot showing left leg gram response, plotting gram change with respect to center scan location for 5, 10 and 15 scan lines.
Figure 20:
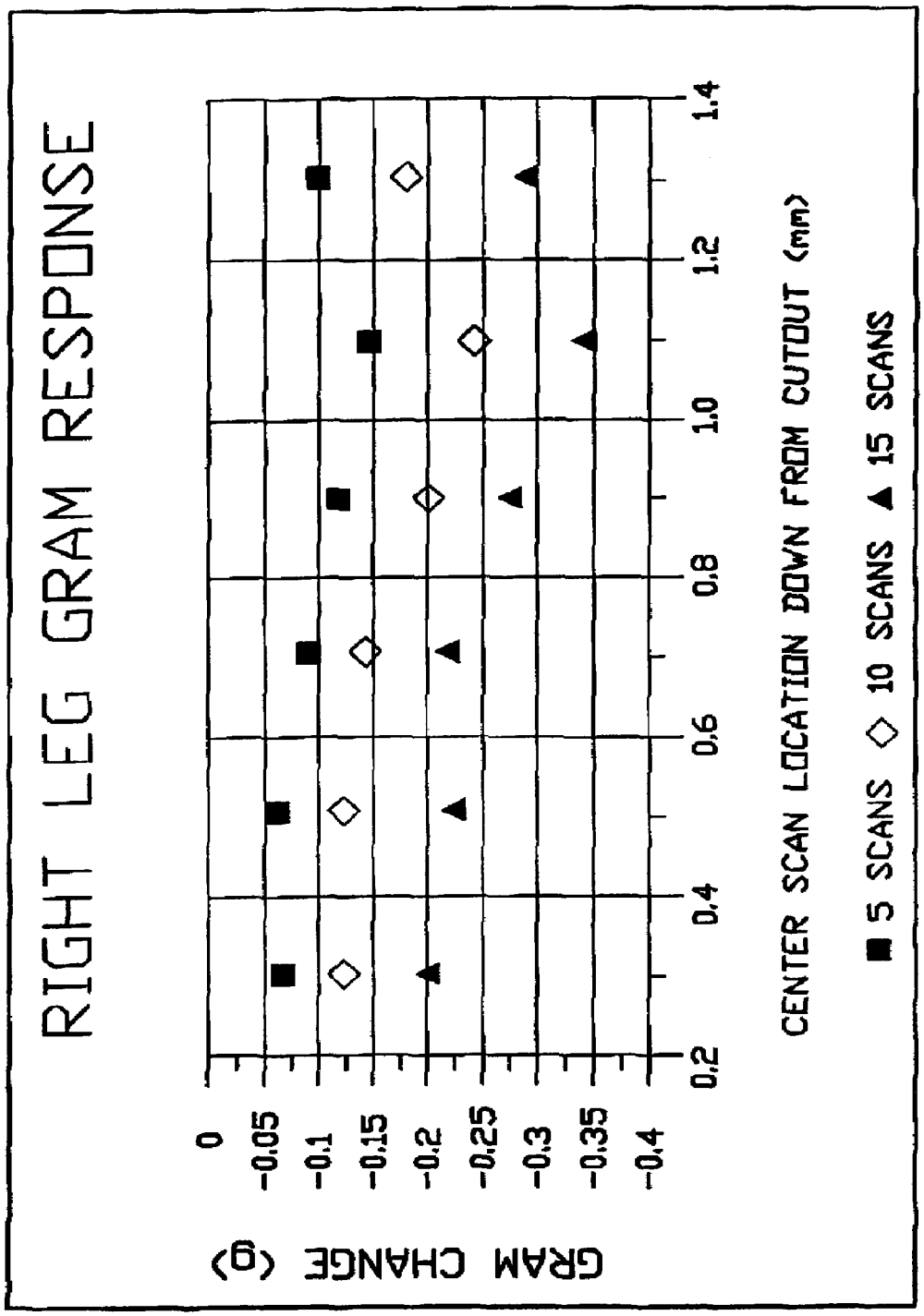
FIG. 20 is a plot showing right leg gram response, plotting gram change with respect to center scan location for 5, 10 and 15 scan lines.
Figure 21:
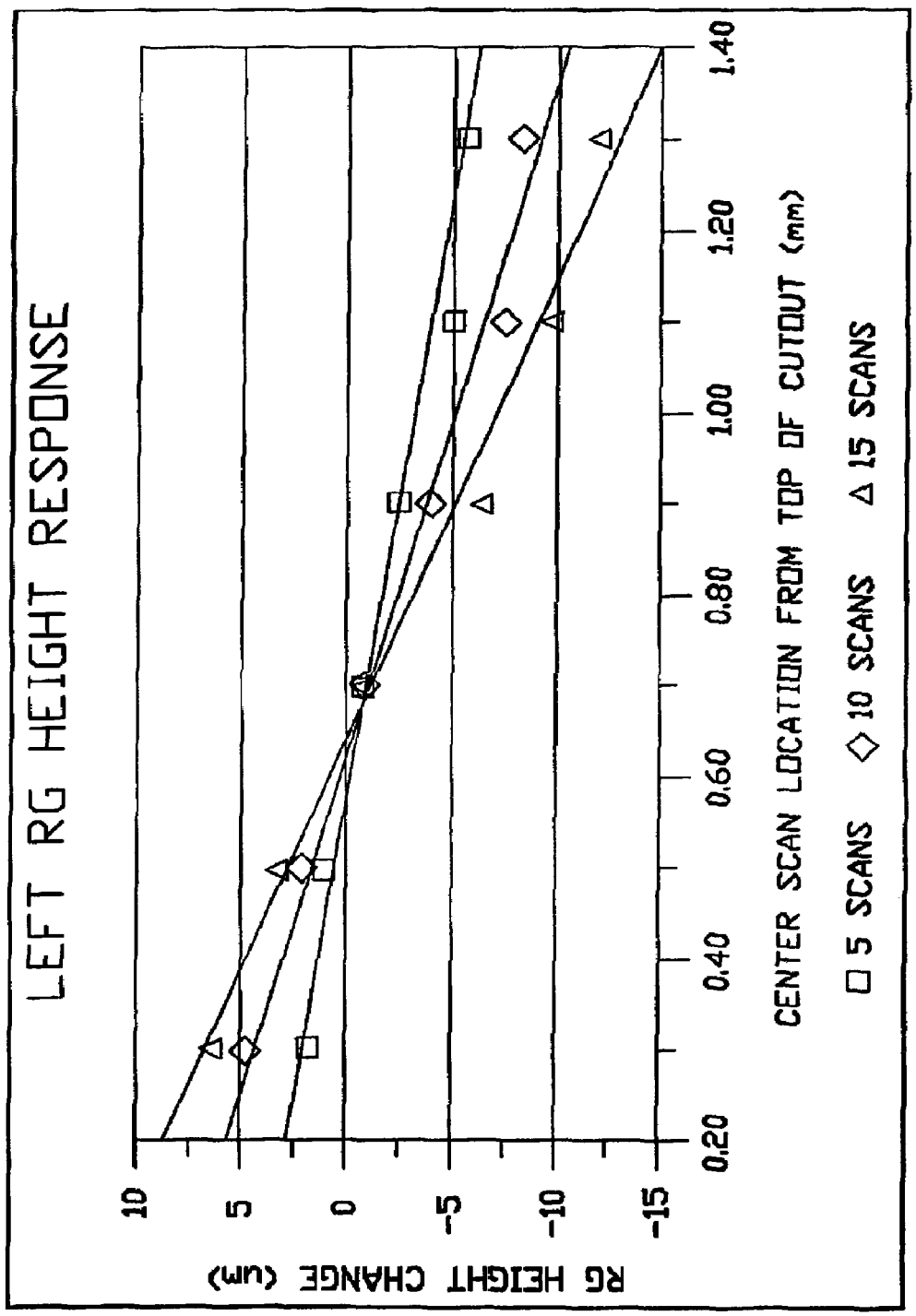
FIG. 21 is a plot showing left RG height response, plotting RG height change with respect to center scan location for 5, 10 and 15 scan lines.
Figure 22:
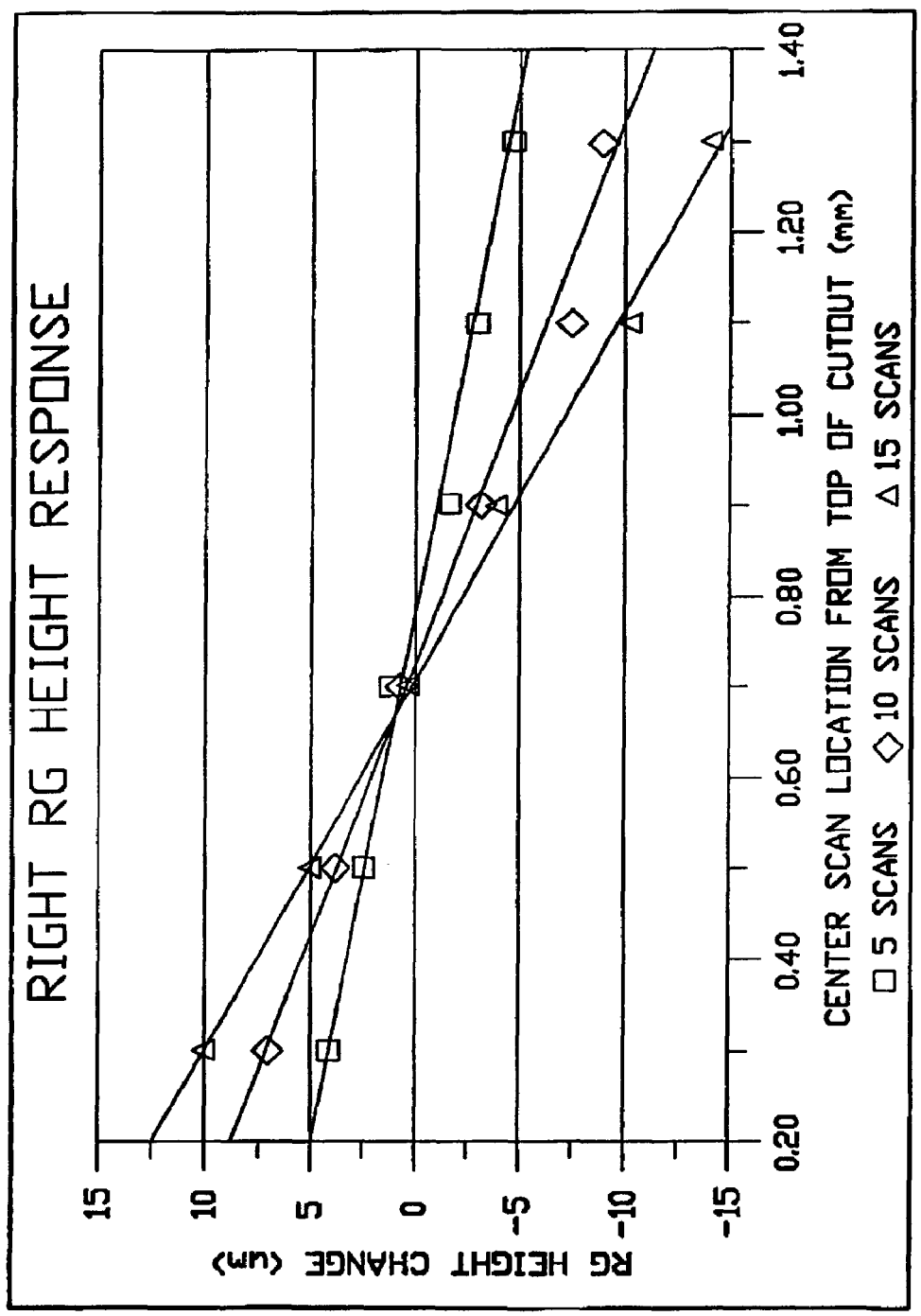
FIG. 22 is a plot showing right RG height response, plotting RG height change with respect to center scan location for 5, 10 and 15 scan lines.

FIG. 17 presents a graph illustrating Delta RG Height versus Number of Scans, for both the slopes and intercepts of CSL. FIG. 18 shows the Change in Gram vs Number of Scans, with CSL as a parameter. As for gram, RG height change is a function of both scan location and number of scans but the relationship is linear. If the scans are located between the center of the radius and the base plate, the RG height will decrease. If the scans are located on the load beam side of the center of the radius, the RG height will increase. From FIG. 17 for a given number of scans, $$\text{Change in } RG \text{ height} = \text{Slope}_{NoS} \times CSL + \text{Intercept}_{NoS} \quad (8)$$

where NoS is the number of scans, and the Intercept is the point at which the individual curve intersects the ordinate on the graph. The relationships in illustrated in FIG. 17 can be expressed as linear equations:

$$\text{Slope}_{NoS} = M_{Slope} \times NoS + C_S \quad (9)$$

$$\text{Intercept}_{NoS} = M_{intercept} \times NoS + C_1 \quad (10)$$

where $M_{Slope}$ is the slope of the Delta RG height versus CSL Slopes versus NoS, $M_{intercept}$ is the slope of the Delta RG height versus CSL Intercepts versus NoS, and $C_S$ and $C_1$ are constants that are set to zero since there is no change when the number of scans is zero.

By substituting $[M_{Slope} \times \text{NoS}]$ in place of $[\text{Slope}_{NoS} \times CSL]$ and $[M_{Intercept} \times \text{NoS}]$ in place of Intercept$_{NoS}$ in Equation (8), the change in RG height can be expressed as a function of both CSL (center scan location) and NoS (number of scans):

$$\text{Incremental } RG \text{ height} = M_{Slope} \times \text{NoS} \times CSL + M_{Intercept} \times \text{NoS} \quad (11)$$

To adjust gram load and RG height simultaneously, the effect of CSL on gram needs to be considered. The change in gram load versus the number of scans at a given CSL can be derived from FIG. 18. Referring to the graph of FIG. 18, linear approximations can be utilized. The following are the gram load adjust equations for gram load as a function of CSL and NoS.

$$\text{Coarse Delta Gram} = (\text{Slope}CSL \times CSL) + (\text{Slope}CSL^2 \times CSL^2) + (\text{Slope}NoS \times NoS) + (\text{Slope}NoS^2 \times NoS^2) + \text{Constant} \quad (12)$$

$$\text{Fine Delta Gram} = (\text{Slope}CSL_{coarse} \times CSL_{coarse}) + (\text{Slope}CSL_{fine} \times CSL_{fine}) + (\text{Slope}CSL^2_{fine} \times CSL^2_{fine}) + (\text{Slope}NoS_{coarse} \times NoS_{coarse}) + (\text{Slope}NoS_{fine} \times NoS_{fine}) + (\text{Slope}NoS^2_{fine} \times NoS^2_{fine}) + \text{Constant} \quad (13)$$

To adjust gram load and RG height at the same time, the Gram and RG height equations [(12) and (11)] and [(13) and (11)] are solved simultaneously.

After initial gram load and RG height measurements are made, and desired delta gram and delta RG height are calculated, an iterative method for the number of scans is used to determine how to best adjust gram load and RG height, where the number of scans is in the range of 1 to MAX, where MAX is a maximum number of scans which is the largest number of scans that can be performed within the adjust region. For each iteration of the number of scans, a "Best CSL" is calculated to move RG height as close to the target as possible. A gram load change is then calculated. The actual number of scans are chosen after iterating through all of the possible number of scans, and choosing the number that predicts moving gram load as close as possible to the target gram load. It has been found through experimentation, that this process converges, achieving an error minimization for gram load as it occurs. It is to be understood that RG height error may be chosen to be minimized, instead of gram load. Furthermore, a combined reduced error criteria for both gram load and RG height may be selected in a manner that blends both, if gram load and RG height are not able to simultaneously be minimized.

In addition to adjusting overall gram load and RG height for a load beam, it is within the scope of the present invention to simultaneously adjust those parameters for individual legs of the load beam. By "leg" (or "arm") is meant the part of the spring region lateral of the aperture. In this aspect of the invention, left and right gram response can be individually adjusted, along with respective left and right radius geometry height adjustments. Such separate adjustability of the left and right legs of the spring region enable adjustment of delta height for the suspension. Example curves are shown in FIGS. 19–22, with it being understood that the left leg gram response and left RG Height response are for the left leg and the right leg gram response and right RG Height response are for the right leg of a load beam for a model 3430 head suspension manufactured by Hutchinson Technology, Inc.

Figure 23:
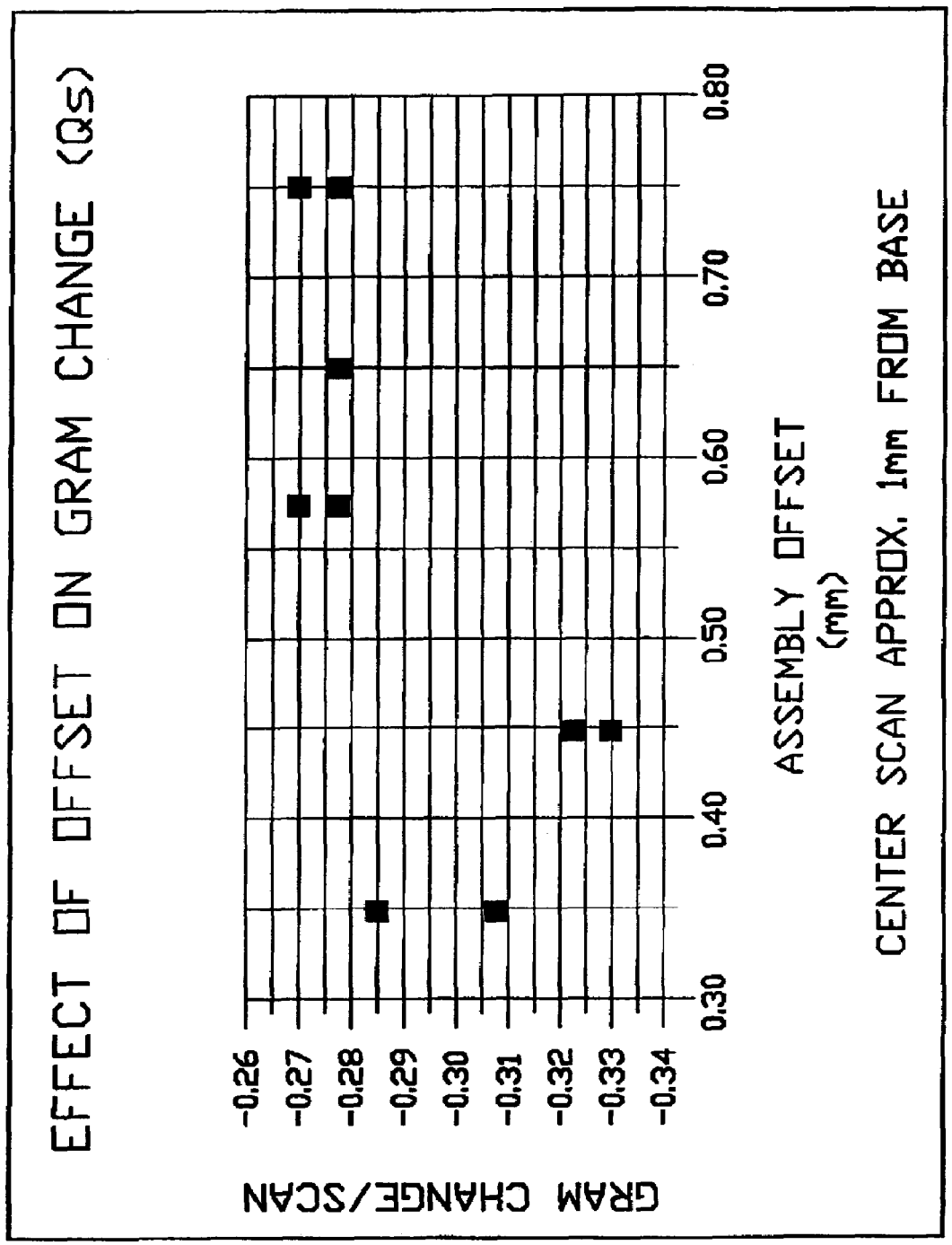
FIG. 23 is a plot of the effect of Offset on gram change with gram change/scan plotted against Assembly Offset.

The effect of stress due to elevation was investigated on particular models of load beams (identified as models QS and 3420 offered by the assignee of the present invention) by changing the offset height and comparing the change in gram per scan. The load beam was scanned with the center scan located at the maximum response location, at the center of the bend. FIG. 23 shows that the difference in gram response/scan is insignificant to cause a loss in gram adjust range.

For just Gram and RG height adjust the scans on the part were symmetrical. To reduce a "twist" error where delta height is not equal to zero, the scan location on each leg is varied. RG height now is defined as Average Height since it is the average of the heights of both legs of the load beam.

For Coarse Adjust:

$$\text{Delta Average Height} = (\text{Slope } CSL_{avg} * CSL_{avg} + \text{Constant}) * NSc \quad (14)$$

$$\text{Delta Delta Height} = (\text{Slope} CSL_{bias} * CSL_{bias} + \text{Constant}) * NSc \quad (15)$$

$$\text{Delta Gram} = \text{Slope} NSc * NSc + (\text{Slope } NSc^2 + NSc^2) + \text{Slope Left } CSL * \text{Left } CSL + \text{Slope Right } CSL * \text{Right } CSL + (\text{Slope } CSL\text{bias}^{0.5} * CSL\text{bias}^{0.5}) + \text{Constant} \quad (16)$$

For Fine Adjust:

$$\text{Delta Average Height} = (\text{Slope} CSLF * CSLF + \text{Constant}) * NSF \quad (17)$$

$$\text{Delta Delta Height} = (\text{Slope} CSLF * CSLF + \text{Constant}) * NSF \quad (18)$$

$$\text{Delta Gram} = \text{Slope } NSF * NSF + (\text{Slope} NSF^2 * NSF^2) + \text{Slope } NSc * NSc + \text{SlopeLeft} CSLF * \text{Left} CSLF + \text{SlopeRight} CSLF * \text{Right} CSLF + (\text{Slope} CSL\text{bias}^{0.5} * CSL\text{bias}^{0.5}) + \text{Constant} \quad (19)$$

Where NSc is the number of coarse scans and NSF is the number of fine scans.

The Center Scan Location is now an average of the left and right center scan locations as given by Equation (20):

$$CSL_{avg} = (\text{Left } CSL + \text{Right } CSL)/2 \quad (20)$$

In addition, to fully describe Center Scan Location, a bias value is given by Equation (21):

$$CSL\text{bias} = \text{Left } CSL - \text{Right } CSL \quad (21)$$

The Maximum number of scans MaxNoScans that can be placed on a part is given by Equation (22):

$$\text{MaxNoScans} = (\text{scan limit at the load beam end} - \text{scan limit at the base end})/\text{scan spacing} \quad (22)$$

Procedure

Measure the part and compute the desired delta gram, delta average height and delta delta height.

Since Delta Average Height=(Slope $CSL_{avg}*CSL_{avg}$+Constant)*NS, where NS is the number of scans, for a given number of scans:

$CSL_{avg}$=(Desired Delta Average Height/(Slope $CSL_{avg}*NS$))−(Constant/Slope$CSL_{avg}$)

Choose $CSL_{avg}$ as close to base or load beam as possible if calculated CSL is outside the range (as in earlier procedure).

Since Delta Delta Height=(Slope$CSL_{bias}*CSL_{bias}$+Constant)*NS

For a given NS:

$$CSL_{bias}=(\text{Desired Delta Delta Height}/(\text{Slope } CSL_{bias}*NS))-(\text{Constant}/CSL_{bias}) \quad (23)$$

Choose maximum or minimum $CSL_{bias}$ if calculated $CSL_{bias}$ is beyond a feasible location.

EXAMPLE

Min/Max $CSL_{bias}$=+/−(load beam limit−base end limit)−(NS−1)*scan spacing. If NS=31 and (load beam limit−base end limit)=1.0 mm, and scan spacing equals 0.02 mm, then Min/Max $CSL_{bias}$=+/−0.4 mm.

It is to be understood that there needs to be an option to choose which adjusted parameter is most important. When Average Height is most critical, $CSL_{avg}$ is given higher priority than $CSL_{bias}$. When Delta Height is more critical, $CSL_{bias}$ is given higher priority than $CSL_{avg}$.

Example: If NS=31 and (load beam limit−base end limit)=1.0 mm, and scan spacing=0.02 mm, then:
For Average Height priority:
If calculated CSL is <0.3 or >0.7, $CSL_{bias}$ must be 0
For Delta Height priority:
If calculated $CSL_{bias}$ is <−0.04 or >0.04, CSL must be 0.5 mm.

In the examples described above, the amount of scanning necessary to effect a desired adjustment is described in terms of the number of scans needed to accomplish the course and fine adjustments for a given beam power, beam diameter, scan velocity, and scan line spacing. The relationship between the adjustment achieved and the amount of scanning performed can also be determined as a function of a different laser operating parameters. For example, the number of scan lines could be held constant while the laser beam intensity is varied to determine the relationship between adjustment and beam intensity. Both coarse and fine adjustments can be determined in this manner.

It is within the practice of the present invention to adjust the suspension using double sided scanning, wherein the apparatus and method may be utilized by scanning a laser beam across both the top and the bottom of the spring region of the suspension.

Although the present invention has been described with reference to preferred embodiments, workers skilled in the art will recognize that changes may be made in form and detail without departing from the spirit and scope of the invention.

What is claimed is:

1. A method for adjusting parameters for a head suspension comprising the step of simultaneously adjusting the gram load and radius geometry height of a head suspension by scanning a portion of a spring region between a rigid beam region and a mounting region of the head suspension with a laser beam, and controlling an amount and/or location of heat applied to the spring region by controlling the scanning or laser beam parameters, such that the gram load and radius geometry height of the head suspension are simultaneously adjusted.

2. The method of claim 1, wherein the step of scanning the head suspension includes a substep of scanning a first scan region in a first arm of the spring region of the head suspension.

3. The method of claim 2, wherein the step of scanning further includes an additional substep of scanning a second scan region of a second arm of the spring region of the head suspension.

4. The method of claim 3, wherein the scanning of the second scan region is performed symmetrically to the scanning of the first scan region.

5. The method of claim 3 wherein the scanning of the second scan region is performed asymmetrically to the scanning of the first scan region.

6. The method of claim 3 wherein the method further comprises adjusting a delta height of the suspension.

7. The method of claim 1, wherein the step of scanning includes scanning a plurality of lines.

8. The method of claim 7, wherein each of the plurality of lines scanned extends substantially across the width of the spring region, the plurality of lines being substantially parallel to a transverse axis of the head suspension.

9. The method of claim 7, wherein the scanning is located in a top surface of the spring region of the head suspension.

10. The method of claim 7 wherein the scanning is located in a bottom surface of the spring region of the head suspension.

11. The method of claim 1 wherein the step of scanning a spring region further comprises scanning a first side of the spring region.

12. The method of claim 1 further comprising providing an inert gas for the environment of the spring region being scanned.

13. The method of claim 12 wherein the inert gas is nitrogen.

14. The method of claim 12 wherein the inert gas is provided indirectly to the environment of the spring region being scanned.

15. The method of claim 3, wherein the first scan region and the second scan region are each scanned from a side towards a center of the head suspension.

16. The method of claim 15 wherein the substep of scanning includes scanning entirely across the first and second scan regions of the head suspension.

17. The method of claim 7 wherein the substep of scanning includes scanning entirely across the spring region of the head suspension.

18. The method of claim 1, further comprising the step of: determining the location and amount of scanning necessary to effect a pair of desired adjustments of gram load and radius geometry height from stored data describing the relationship between the location and amount of scanning, and the amount of adjustment needed in gram load and radius geometry.

19. The method of claim 18, wherein the relationship between the gram load and radius geometry adjustment and the location and amount of scanning is determined as a function of the center scan line location and the number of scan lines scanned in the head suspension.

20. The method of claim 18 wherein the suspension further includes first and second legs in the spring region and the method further comprises determining the location and amount of scanning necessary to correct a delta height for the suspension from stored data describing the relationship between the location and amount of scanning, and the amount of adjustment needed to correct the delta height.

21. A method of simultaneously adjusting gram load and radius geometry height of at least one of a pair of legs in a spring region of a longitudinally extending head suspension for a disk drive of the type having a load beam with the spring region having a bend radius located between a mounting region and a rigid region and at least one aperture in the spring region dividing the spring region into the at least one pair of legs, the method comprising the step of transversely scanning at least one leg of the spring region with a focused laser beam in at least one scan line and controlling an amount and/or location of heat applied to the spring region by controlling the scanning or laser beam parameters.

22. The method of claim 21 wherein the step comprises sweeping the scan line from a first position on one side and exterior of the load beam to a second position interior of the aperture after scanning only one leg of the spring region.

23. The method of claim 22 further comprising an additional step of sweeping a scan line on at least one other leg of the spring region by starting from a third position on the other side and exterior of the load beam and ending at a fourth position interior of the aperture.

24. The method of claim 21 further comprising simultaneously adjusting the incremental height difference between the pair of legs.

* * * * *